(12) United States Patent
Brockmann et al.

(10) Patent No.: US 12,120,400 B2
(45) Date of Patent: *Oct. 15, 2024

(54) SYSTEMS AND METHODS OF ALTERNATIVE NETWORKED APPLICATION SERVICES

(71) Applicant: ActiveVideo Networks, LLC, San Jose, CA (US)

(72) Inventors: Ronald A. Brockmann, Los Gatos, CA (US); Maarten Hoeben, Acquapendente (IT)

(73) Assignee: ACTIVEVIDEO NETWORKS, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/228,590

(22) Filed: Jul. 31, 2023

(65) Prior Publication Data

US 2023/0379552 A1 Nov. 23, 2023

Related U.S. Application Data

(63) Continuation of application No. 17/544,822, filed on Dec. 7, 2021, now Pat. No. 11,750,892, which is a
(Continued)

(51) Int. Cl.
*H04N 7/173* (2011.01)
*H04N 21/231* (2011.01)
(Continued)

(52) U.S. Cl.
CPC ... *H04N 21/6587* (2013.01); *H04N 21/23106* (2013.01); *H04N 21/4312* (2013.01);
(Continued)

(58) Field of Classification Search
CPC ......... H04N 21/6587; H04N 21/23106; H04N 21/4312; H04N 21/632; H04N 21/8456;
(Continued)

(56) References Cited

U.S. PATENT DOCUMENTS 5,592,622 A  1/1997 Isfeld
5,805,804 A  9/1998 Laursen et al.
(Continued)

FOREIGN PATENT DOCUMENTS

| EP | 2720435 A1 | 4/2014 |
|---|---|---|
| WO | WO2011/139155 A1 | 11/2011 |
| WO | WO2019/006185 A1 | 1/2019 |

OTHER PUBLICATIONS

ActiveVideo Networks, Inc., International Search Report and Written Opinion, PCT/US2018/040118, Oct. 26, 2018, 10 pgs.
(Continued)

*Primary Examiner* — Gigi L Dubasky
(74) *Attorney, Agent, or Firm* — Chernoff, Vilhauer, McClung & Stenzel, LLP

(57) ABSTRACT

A server system hosts one or more virtual machines. The server system receives a first media stream that includes first content corresponding to a plurality of frames of video data and generates a first digest segment that corresponds to the first media stream, wherein the first digest segment includes a representation of the plurality of frames but does not include the video data. The server system stores the first digest segment in a cache at the server system; and receives a playback position of the first media stream at a first client device. The server system uses the playback position from the first client device and the first digest segment stored in the cache to perform processing to recreate a representation of the playback of the first media stream on the first client device.

20 Claims, 15 Drawing Sheets

Related U.S. Application Data continuation of application No. PCT/US2021/061896, filed on Dec. 3, 2021.

(60) Provisional application No. 63/122,425, filed on Dec. 7, 2020.

(51) Int. Cl.
| | | |
|---|---|---|
| *H04N 21/431* | (2011.01) | |
| *H04N 21/63* | (2011.01) | |
| *H04N 21/6587* | (2011.01) | |
| *H04N 21/845* | (2011.01) | |
| *H04N 21/8547* | (2011.01) | |

(52) U.S. Cl.
CPC ....... *H04N 21/632* (2013.01); *H04N 21/8456* (2013.01); *H04N 21/8547* (2013.01)

(58) Field of Classification Search
CPC ............. H04N 21/8547; H04N 21/222; H04N 21/43072; H04N 21/8146
See application file for complete search history.

(56) References Cited

U.S. PATENT DOCUMENTS

| | | | |
|---|---|---|---|
| 6,141,753 | A | 10/2000 | Zhao |
| 7,058,815 | B2 | 6/2006 | Morin |
| 7,127,735 | B1 | 10/2006 | Lee |
| 9,167,281 | B2 | 10/2015 | Petrov |
| 9,621,853 | B1 | 4/2017 | Yang et al. |
| 10,104,143 | B1 | 10/2018 | Li |
| 11,750,892 | B2 * | 9/2023 | Brockmann ......... H04N 21/222 725/110 |
| 2004/0189677 | A1 | 9/2004 | Amann |
| 2005/0034152 | A1 | 2/2005 | Matsumoto et al. |
| 2006/0050973 | A1 | 3/2006 | Ishikawa |
| 2006/0122946 | A1 | 6/2006 | Fahmy |
| 2008/0005676 | A1 | 1/2008 | Evans et al. |
| 2008/0155614 | A1 | 6/2008 | Cooper |
| 2008/0267576 | A1 | 10/2008 | Seo |
| 2009/0169074 | A1 | 7/2009 | Avinash |
| 2010/0303146 | A1 | 12/2010 | Kamay |
| 2010/0325657 | A1 | 12/2010 | Sellers |
| 2011/0022566 | A1 | 1/2011 | Beaverson |
| 2011/0242133 | A1 | 10/2011 | Greaves |
| 2012/0188442 | A1 | 7/2012 | Kennedy |
| 2012/0198572 | A1 | 8/2012 | Beals |
| 2012/0222071 | A1 | 8/2012 | Gaede et al. |
| 2013/0031222 | A1 | 1/2013 | Molander |
| 2013/0204927 | A1 | 8/2013 | Kruglikov et al. |
| 2013/0291082 | A1 | 10/2013 | Giladi |
| 2014/0068692 | A1 | 3/2014 | Archibong |
| 2014/0108497 | A1 | 4/2014 | Yao et al. |
| 2014/0146052 | A1 | 5/2014 | Takamura |
| 2014/0173695 | A1 | 6/2014 | Valdivia |
| 2014/0282773 | A1 | 9/2014 | Hurst et al. |
| 2014/0320673 | A1 | 10/2014 | Agrawal et al. |
| 2015/0019817 | A1 | 1/2015 | Akirav |
| 2015/0215358 | A1 | 7/2015 | Wang et al. |
| 2016/0182941 | A1 | 6/2016 | Crabtree |
| 2016/0191627 | A1 | 6/2016 | Huang et al. |
| 2017/0054765 | A1 | 2/2017 | Tucker |
| 2018/0144432 | A1 | 5/2018 | Karppanen |
| 2020/0128282 | A1 | 4/2020 | Brockmann |
| 2020/0409647 | A1 | 12/2020 | Brockmann |
| 2021/0099671 | A1 | 4/2021 | Bakke |

OTHER PUBLICATIONS

ActiveVideo Networks, Inc., International Preliminary Report on Patentability, PCT/US2018/040118, Dec. 31, 2019, 7 pgs.

ActiveVideo Networks, Inc., International Search Report and Written Opinion, PCT/US2020/36263, Sep. 28, 2020, 10 pgs.

ActiveVideo Networks, Inc., International Preliminary Report on Patentability, PCT/US2020/36263, Dec. 28, 2021, 7 pgs.

ActiveVideo Networks, Inc., International Search Report and Written Opinion, PCT/US2021/061896, Feb. 18, 2022, 13 pgs.

ActiveVideo Networks, Inc., Extended European Search Report, EP18822807.6, May 25, 2020, 9 pgs.

ActiveVideo Networks, Inc., Examination Report, EP18822807.6, Jan. 3, 2023, 5 pgs.

ActiveVideo Networks, Inc., Extended European Search Report, EP20831119.1, Jun. 19, 2023, 7 pgs.

Brockmann, Office Action, U.S. Appl. No. 16/721,125, May 1, 2020, 13 pgs.

Brockmann, Final Office Action, U.S. Appl. No. 16/721,125, Oct. 8, 2020, 13 pgs.

Brockmann, Notice of Allowance, U.S. Appl. No. 16/721,125, May 18, 2021, 15 pgs.

Brockmann, Office Action, U.S. Appl. No. 16/890,957, Jan. 18, 2022, 13 pgs.

Brockmann, Notice of Allowance, U.S. Appl. No. 16/890,957, May 13, 2022, 7 pgs.

Brockmann, Office Action, U.S. Appl. No. 17/403,821, Aug. 16, 2022, 15 pgs.

Brockmann, Final Office Action, U.S. Appl. No. 17/403,821, Jan. 4, 2023, 15 pgs.

Brockmann, Notice of Allowance, U.S. Appl. No. 17/544,822, Feb. 10, 2023, 9 pgs.

Brockmann, Notice of Allowance, U.S. Appl. No. 17/544,822, Apr. 26, 2023, 8 pgs.

Pavel et al., "Video digest: a browsable, skimmable format for informational lecture videos.", UIST vol. 10. 2014, Oct. 5, 2014. 10 pgs.

* cited by examiner

900

902 — At a server system hosting one or more virtual machines, each associated with a respective client device of one or more client devices for playback of media streams:

904 — At a first virtual machine corresponding to a first client device:

906 — Receive, a first media stream that includes first content corresponding to a plurality of frames of video data

908 — The video data comprises image content in each frame of the plurality of frames in the first media stream.

910 — The first media stream is received from the first client device.

912 — The first media stream is received from a content provider.

914 — Determine, at the first virtual machine, that there is not a digest segment stored in the cache corresponding to the first video stream, wherein the generating and storing are performed in accordance with the determination that there is not a digest segment stored in the cache corresponding to the first video stream

916 — Generate a first digest segment that corresponds to the first media stream, wherein the first digest segment includes a representation of the plurality of frames but does not include the video data

918 — The representation of the plurality of frames in the first digest segment includes a segment header for the first media stream.

920 — The representation of the plurality of frames in the first digest segment includes at least one respective frame header that corresponds to a respective frame of the plurality of frames.

| At a second virtual machine corresponding to a second client device distinct from the first client device, that is playing back the first media stream: | 930 |

| Use the playback position from the second client device and the first digest stored in the cache to perform processing to recreate a representation of the playback of the first media stream on the second client device | 938 |

| Processing to recreate a representation of the playback of the first media stream on the second client device comprises using the first digest segment, stored in the cache, to generate a reconstructed media stream based on the first digest segment, wherein the reconstructed media stream includes dummy data that is distinct from the video data | 940 |

| Determine, using the first digest segment stored in the cache and the received playback position, a second overlay for the first media stream and transmit, to the second client device, the second overlay for the first media stream. | 942 |

┌─────────────────────────────────────────────────────────────────┐
│ At a second virtual machine corresponding to a second client device distinct ├── 930
│ from the first client device, that is playing back the first media stream:   │
│                                                                  │
│                          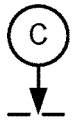                    │
│                                                                  │
│ ┌─────────────────────────────────────────────────────────────┐ │
│ │ Receive, from the second client device, a playback command;  │├── 944
│ │                                                              │ │
│ │   In response to receiving the playback command, determine, using │ │
│ │ reconstructed media stream, a first playback position of the first media │ │
│ │ stream at the second client device, wherein the second overlay is │ │
│ │ determined based on the playback command for the first media │ │
│ │ stream and the second overlay is transmitted to the second client │ │
│ │ device for display at the first playback position of the first media │ │
│ │                          stream.                             │ │
│ │ ┌──────────────────────────────────────────────────────────┐ │ │
│ │ │ The first virtual machine of the one or more virtual machines │ │ │
│ │ │ executes a first application that includes a first Application │ │ │
│ │ │ Programming Interface (API) and determining the first overlay │ ├── 946
│ │ │ comprises transmitting the reconstructed media stream to the first │ │ │
│ │ │ application via the first API and receiving the first overlay back │ │ │
│ │ │ from the first API.                                       │ │ │
│ │ │ ┌────────────────────────────────────────────────────┐   │ │ │
│ │ │ │ The first overlay comprises one or more graphical user │   │ ├── 948
│ │ │ │ interface elements provided by the first application. │   │ │ │
│ │ │ └────────────────────────────────────────────────────┘   │ │ │
│ │ └──────────────────────────────────────────────────────────┘ │ │
│ └─────────────────────────────────────────────────────────────┘ │
└─────────────────────────────────────────────────────────────────┘

Figure 9D

SYSTEMS AND METHODS OF ALTERNATIVE NETWORKED APPLICATION SERVICES

RELATED APPLICATIONS

This application is a continuation U.S. patent application Ser. No. 17/544,822, entitled "Systems and Methods of Alternative Networked Application Services," filed on Dec. 7, 2021, which is a continuation of International Application No. PCT/US21/61896, entitled "Systems and Methods of Alternative Networked Application Services," filed on Dec. 3, 2021, which claims priority to U.S. Provisional Application No. 63/122,425, entitled "Systems and Methods of Alternative Networked Application Services," filed on Dec. 7, 2020.

This application is also related to U.S. patent application Ser. No. 16/890,957, entitled "Orchestrated Control for Displaying Media," filed on Jun. 2, 2020, which claims priority to U.S. Provisional Application No. 62/868,310, filed on Jun. 28, 2019, each of which is hereby incorporated by reference in its entirety. This application is also related to U.S. patent application Ser. No. 16/721,125, entitled "Systems and Methods of Orchestrated Networked Application Services," filed on Dec. 19, 2019, which is a continuation of International Application No. PCT/US18/40118, filed Jun. 28, 2018, which claims priority to U.S. Provisional Application No. 62/526,954, filed Jun. 29, 2017, each of which is hereby incorporated by reference in its entirety.

FIELD OF ART

The present invention relates generally to controlling display of media by a client, and more particularly to controlling, by a server, media displayed by a client based on information received by the server from the client.

BACKGROUND

Application servers providing various remote applications to client devices have been in common use for several decades. Prior to the advent of broadband access to the Internet, these servers were primarily offered by cable television providers on a private network via the cable TV infrastructure. With the arrival of broadband content services, some application services are now hosted "in the cloud" on server systems providing service to client devices such as personal computer laptops, tablets and mobile phones.

Not to be confused with accessing webpages on a common web server, application servers execute an application on the server at a remote location and send the resulting output, usually in the form of a screen image, or sequence of images, or a video stream, to the client device which the user sees and interacts with. To the user, the application service appears to be running on the device in front of them while, in fact, it is being executed remotely.

Existing interactive television systems have been deployed utilizing advanced application server technology enabling complex interactive TV applications to be deployed as a shared resource; while the complex computing needed to support an advanced user experience is performed in a central location on a shared resource and the output of said shared resource then being transmitted back to the user. Typically, a service manager is provided which assigns a virtual set-top application in a central facility to a client device, such as a cable TV set-top (e.g., in a user's home).

Many new interactive TV and video-on-demand (VOD) services are currently becoming available from services delivered by way of the Internet. Typically, these new services interact with a common web browser on a laptop, tablet, or smartphone or require a third-party application to run a dedicated client device such as a third-party Internet set-top or smart TV. There is a need to interact with these services without needing to rely on specialized client devices. However, relative to a common web browser or third-party application on a laptop, tablet or smartphone, a generic legacy TV set-top has limited resources in terms of processing power, graphical capabilities and memory, and is therefore typically not able to support most of these new interactive TV and VOD services due to such limitations.

There is a need to provide a virtualized application service system with multiple benefits for efficient streaming of media assets from third-party content distribution networks to play on a client device located in a subscriber's home enabling the service provider utilizing the invention to minimize their network bandwidth costs. Another benefit of these additional systems and methods is to enable the playing of media assets with proprietary formats where the virtualization of the related application can allow its content to be included in the combined service offerings of the system without requiring any detailed knowledge of the protocols in use.

Accordingly, there is a need for systems that remotely manage content displayed on a client. However, obtaining client information for media delivery management is bandwidth consuming due to the size of graphical data.

SUMMARY

Embodiments described herein are directed to improved systems and methods for updating a virtual client (e.g., in real-time) with a graphics state of a physical client without demanding a high level of bandwidth required to send media content from a physical client to a virtual client.

In accordance with some embodiments, a method performed at a server computing device for remotely processing a media stream is provided. The server system hosts one or more virtual machines, each associated with a respective client device of one or more client devices for playback of media streams. The method comprises, at a first virtual machine corresponding to a first client device, receiving, a first media stream that includes first content corresponding to a plurality of frames of video data and generating a first digest segment that corresponds to the first media stream. The first digest segment includes a representation of the plurality of frames but does not include the video data. The method includes, at the first virtual machine, storing the first digest segment in a cache at the server system. The method further includes, at a second virtual machine corresponding to a second client device distinct from the first client device, that is playing back the first media stream, receiving a playback position of the first media stream at the second client device, and using the playback position from the second client device and the first digest segment stored in the cache to perform processing to recreate a representation of the playback of the first media stream on the second client device.

In some embodiments, a computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

It will be recognized that, in various embodiments, operations described with regard to the client may apply to a server and vice versa.

BRIEF DESCRIPTION OF THE DRAWINGS

FIGS. 9A-9E are flowcharts for a method of generating a digest segment at a client device, in accordance with some embodiments.

DETAILED DESCRIPTION

Figure 1:
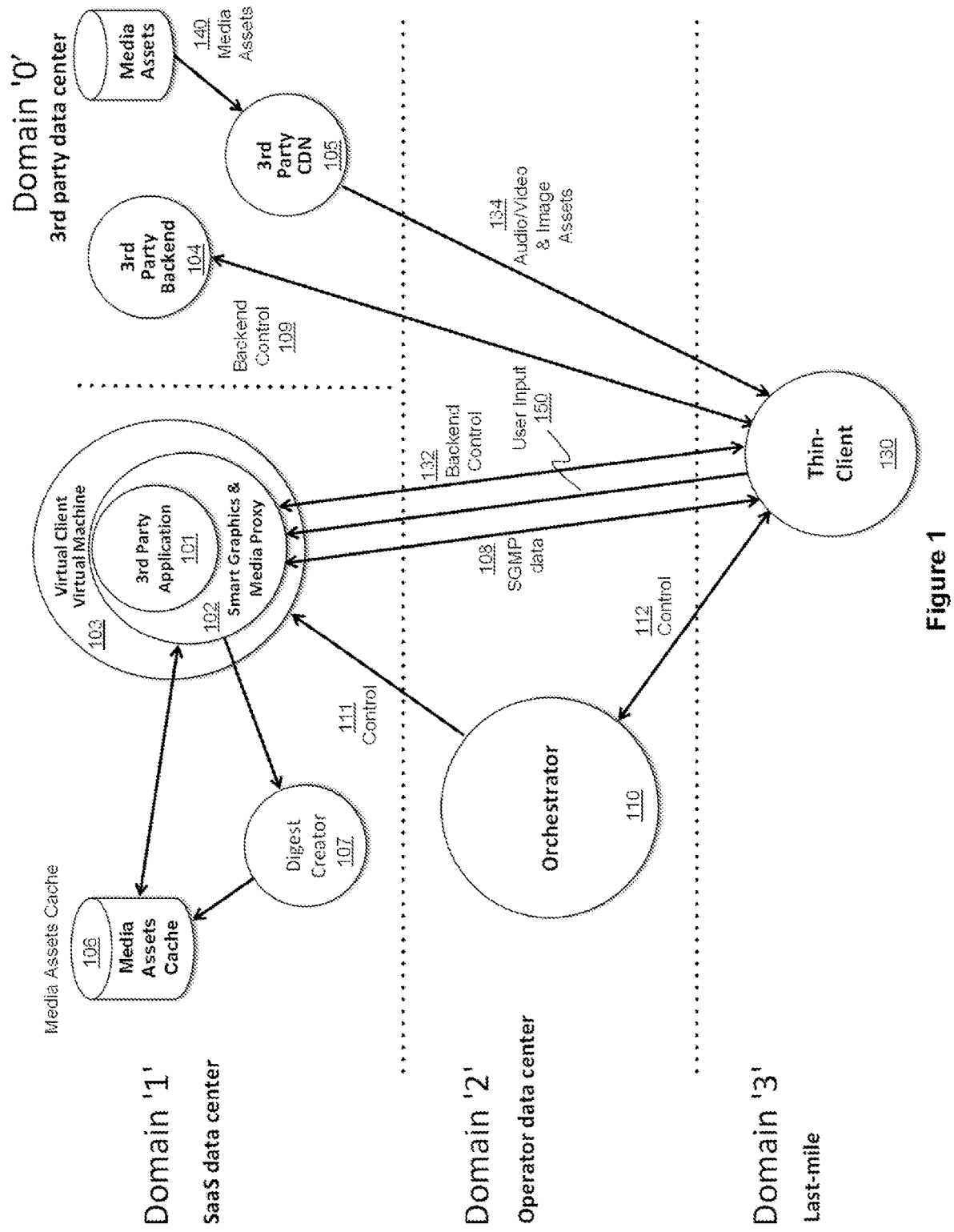
FIG. 1 is a top-level diagram illustrating a content delivery system, in accordance with some embodiments.

In accordance with some embodiments, computer systems provide an environment for third-party applications in which applications can run unmodified in a server environment in the third-party's domain (e.g., in a manner that is transparent to third-party applications that run on a client device). In some embodiments, an "orchestration" function (e.g., in the operator's domain) coordinates one or more third-party applications running in their respective server environments. In some embodiments, a client device (e.g., in the user's domain) provides a seamless experience to the user as though the third-party applications were running locally on the client device. In some embodiments, the orchestration function manages both user and client application-initiated events by coordinating with the client device. In some embodiments, the third-party's application resource requirements are determined based on a client device's capabilities (e.g., graphics capabilities) and/or environment (e.g., network conditions between server and client). In some embodiments, application and media resources (e.g., audio/video streams, images, scripts and/or digital-rights-management (DRM) information) are retrieved from third-party application back-ends and/or content delivery networks (CDN) (e.g., avoiding passing said resources through the third-party application in the server environment or the orchestration function).

Various embodiments described herein are directed to improvements of application server systems. In such systems, the user interacts with various interactive TV and VOD applications in a central facility such as a cable TV headend on a remote basis; with the user's interactions sent to the headend and video images transmitted back to the user's set-top. In this way, the user perceives the application as though it were running locally inside the set-top box. This mode of operation serves applications to the user with a typically high-level of interactivity measured by the responsiveness of the overall system. This responsiveness is achieved by operating the system within the confines of the cable TV network with high-bandwidth and low-latency between the client set-top box (STB) in the home and the server system in the headend.

A super-structure that combines application services from a headend with Internet-delivered services and third-party applications is provided. In some embodiments, translations of protocols allow various client devices, including by way of example and without limitation, a legacy STB, an Internet set-top, a smart TV, a tablet, or a smartphone, to interact with—and consume content from—any source within or outside of the cable TV network. In some embodiments, the structure further operates completely apart from a cable TV network and coordinate services from the Internet at large.

In some embodiments, the applications include user interface elements rendered via a graphics API (e.g., OpenGL) with full-screen video and/or partial-screen video (e.g., managed via a video playback API such as OpenMAX). The applications are meant to be ported, installed and run locally on the client device. Instead, in some embodiments, methods are provided for running the application as, or similar to, unmodified Virtual Client Virtual Machines (VCVM) running on application servers in a different domain than the client's or central facility's domain. By virtualizing the used APIs, such as OpenGL and OpenMAX, application functionality can be separated from the rendering functionality. In some embodiments, the combining of disparate elements takes place in the client device under control of a respective smart-graphics-&-media-proxy (SGMP) at the application server. For example, in the client device, video is mixed with graphics by means of a graphics API, such as OpenGL, which treats the video as a texture layer to mix appropriately with other texture layers whether graphical or full motion. This is, compared to the complexity of a full client application, a relatively simple and low resource intensive process. Hence the thinned and application independent functionality running on the client device is referred to as Thin Client.

In some embodiments, a system that includes the remoted application and a client have a low-bandwidth, high-latency link traversing one or more network domains. Typically, high bandwidth, low-latency topologies and single-domain local area network topologies are used. This is especially important since VCVM and client device generally live in different network domains. For example, the VCVM is typically hosted in the third-party's data center domain, while the client operates at a different location (e.g., in the last-mile of the Internet, at the end-user's premises).

In some cases, CDNs are not located in geographically favorable positions relative to the client device (e.g., there is an unfavorable route from the CDN to the application server). To address this issue, in some embodiments, media content (e.g., audio and video streams) is streamed directly from one or more CDNs to the client device (e.g., without routing them through the application) and the (close to unmodified) application is "tricked" by the virtualized APIs in the SGMP such that it ingests, decodes and plays the media content.

In some embodiments, multiple applications from multiple services are combined by the system to be active concurrently for a single user and presented to the user as a single, seamlessly integrated application. For example, while a user is watching a show in a VOD application, a sports match (e.g., in which a user has indicated an interest) begins. A Program Guide application that is provided by an application that is distinct from the VOD application (and possibly running on another server which might not be related to VOD application), temporarily displays, over the VOD application, an indication (e.g., a small overlaid notification) that the sports broadcast of interest is about to begin.

In some embodiments, an "orchestrator" server coordinates the remoting process of video service or other applications from anywhere on the Internet to a plurality of client media devices (e.g., a legacy cable set-top box, an Internet set-top, a laptop computer, a tablet, and/or a smartphone). In some embodiments, the typical functions of an orchestrator server are augmented with a coordination function (e.g., application or virtual machine life-cycle management) which controls how the different applications share and/or integrate on the client's screen. In some embodiments, the orchestrator server includes a virtual graphics processing unit (GPU) that translates application graphics and audio/video events in a media stream for the purpose of supporting legacy cable set-top boxes that do not have a GPU but can display an equivalent media stream.

Various embodiments of a remote virtualization system and process that enables users of a plurality of various client devices to interact with video and graphic-rich interactive applications running in a remote server environment are provided. The resulting user experience is essentially equivalent to running these applications on the local client device, even when these devices require access to remote server resources such as various graphics rendering and other resources.

In some embodiments, the system and methods enable previously unobtainable efficiencies in the delivery of interactive on-screen user experiences to consumer cable television set-top-boxes, smart TV sets, and numerous other viewing platforms including Internet-connected set-tops, tablets, smartphones, or other mobile devices. The efficiencies are achieved by utilizing virtual set-top applications running on centrally-located virtual application servers. The efficiencies are gained by virtue of the fact that the centralized servers are a shared resource which is allocated on demand and, consequently, not required to be physically deployed for every user of the service.

For those skilled in the art, additional embodiments and applications will be apparent in view of the functionality described herein; including, but not limited to, hybrid hardware and/or software implementations of the functionality described herein, different server-side and client-side consumer electronics, and other devices, as well as numerous scenarios which avoid any requirement that users download and install native mobile apps. Moreover, it will also be apparent to those skilled in the art that the principles disclosed herein can be applied to a wide variety of interactive television as well as Internet-originated applications "apps" running on practically any computer platform found in set-top boxes, mobile devices, or otherwise, without departing from the novelty of the present disclosure.

In some embodiments, a first program running on a first machine interacts with certain internals of a second program running on a second machine. This process, referred to herein as "remoting," is the conveyance of the state of a first program using a graphics API (e.g., OpenGL) and/or a media playback API (e.g., OpenMAX) from a first application running on a first machine (e.g., a server somewhere on the Internet (also known as running "in the cloud") to a second program on a second machine (e.g., a client).

In some embodiments, the remoting system described herein realizes a beneficial separation of control information from data information between network domains.

Various embodiments described herein allow for running a media playback control application on a virtual client virtual machine in a third-party network domain that is different from the operator's network domain and different from the client device's domain. Media assets, such as images and audio/video assets, are directly retrieved and processed by the client without the need to route the data through the media playback control application.

FIG. 1 is a top-level diagram illustrating a content delivery system, in accordance with some embodiments. Components of the content delivery system operate within four domains. Domain 0 is associated one or more third parties (e.g., one or more content providers) at a third party data center. In some embodiments, domain 0 includes third-party backend 104, third-party CDN 105, and media assets 140. Third-party application-specific backend 104 performs operations associated with billing, user authentication, content access, and/or digital rights management. Third party backend 104 communicates backend control 109 to thin-client 130. Thin-client 130 is enabled to forward the backend control 132 to SGMP 102 at the VCVM 103.

Domain 1 is associated with a Software as a service ("SaaS") data center. In some embodiments, a third-party application 101 is deployed in the SaaS data center (domain 1). In some embodiments, the third-party application 101 is provided by a third-party distinct from the third-party associated with domain 0. In some embodiments, third party-application 101 is configured to generate a media stream by combining user interface graphics (e.g. rendered via a Graphics API) with media assets. In some embodiments, the application 101 executes within a virtual client virtual machine 103 (VCVM) on an application server 1000 (FIG. 10) of the SaaS data center. In some embodiments, VCVM 103 includes a smart graphics & media proxy 102 (SGMP).

In some embodiments, the third party application 101 executed on VCVM 103 comprises an application associated with a media content provider. For example, a user of client device (e.g., thin client 130) may request content from a first media content provider. As shown in FIG. 1, the first media provider (e.g., in Domain 0) associated with third-party CDN 105 sends media assets (e.g., audio/video and image assets 134) to the client device. For example, CDN 105 sends a video stream to client 130. In some embodiments, the client 130 sends (e.g., using a graphics API such as OpenGL) a graphics state (e.g., SGMP data 108) of the client device to the VCVM 103. The graphics state of the video stream includes, for example, pixel information (e.g., openGL from the client), timing information (e.g., based on latency between the CDN 105 and the client 130), and/or playback information (e.g., based on user inputs 150/controls received at the client). For example, the client 130 forwards the video stream (or video stream segment) to the VCVM 103 such that the SGMP 102 can process the graphics state information of the client 130. In this way, the VCVM 103 is updated (e.g., in real-time and/or periodically) regarding the graphics state at the client 130 and can, in some embodiments, communicate the client's current graphics state to an orchestrator 110.

Domain 2 is associated with an operator data center. For example, the operator data center may be associated with a cable television system provider. In some embodiments, the operator data center is associated with a service provider distinct from the service provider(s) associated with the third party data center. In some embodiments, orchestrator 110, which is situated in the operator's network (domain 2), is configured to (1) manage client sessions, (2) control playback (e.g., start, end, pause, and/or resume) of media processed by application 101, (3) signal bandwidth settings to the SGMP 102, and/or (4) provide conditional access and digital rights management (DRM) related information to the SGMP 102. In some embodiments, the orchestrator 110 invokes an instance of VCVM 103 (e.g., in response to an input on a client device (e.g., thin client 130)). In some embodiments, the orchestrator 110 receives input, via connection 112, from a user of client device 130 corresponding to a control (e.g., a playback control) and forwards the control, via connection 111, to the VCVM 103. In some embodiments, the orchestrator processes the control and a command to the VCVM 103 in order to control the graphics output by VCVM 103.

Domain 3 is associated with a "last-mile," referring to one or more client devices associated with one or more users. For example, the one or more client devices include a STB (e.g., a STB that includes a graphical processing unit (GPU) or a legacy STB), an Internet set-top, a smart TV, a tablet, a smartphone, and/or an internet of things (IOT) device. Because the third-party Application 101 is executed on an instance of a VCVM 103 in Domain 1, the computing power (e.g., CPU power) required of the client device is application-independent. Thus, the client device(s) may be thin-clients. In some embodiments, the client device 130 does not run multiple applications, each application associated with a distinct content provider, in order to access media content from each of the content providers. Instead, a single (e.g., generic) application (e.g., associated with the operator data center or another provider) runs on the client device and the client device communicates, via connection 108, the graphics state of the client device to the VCVM 103 such that the VCVM 103 can execute the processing of the media content (e.g., combining user interface graphics with video). The client device forwards user input(s) 150 (e.g., playback commands) to the VCVM 103 such that the VCVM 103 determines one or more actions (e.g., commands) to be executed by the client device. For example, the VCVM 103 determines and transmits one or more overlays to the client device for the client device to display over the media content.

Figure 7:
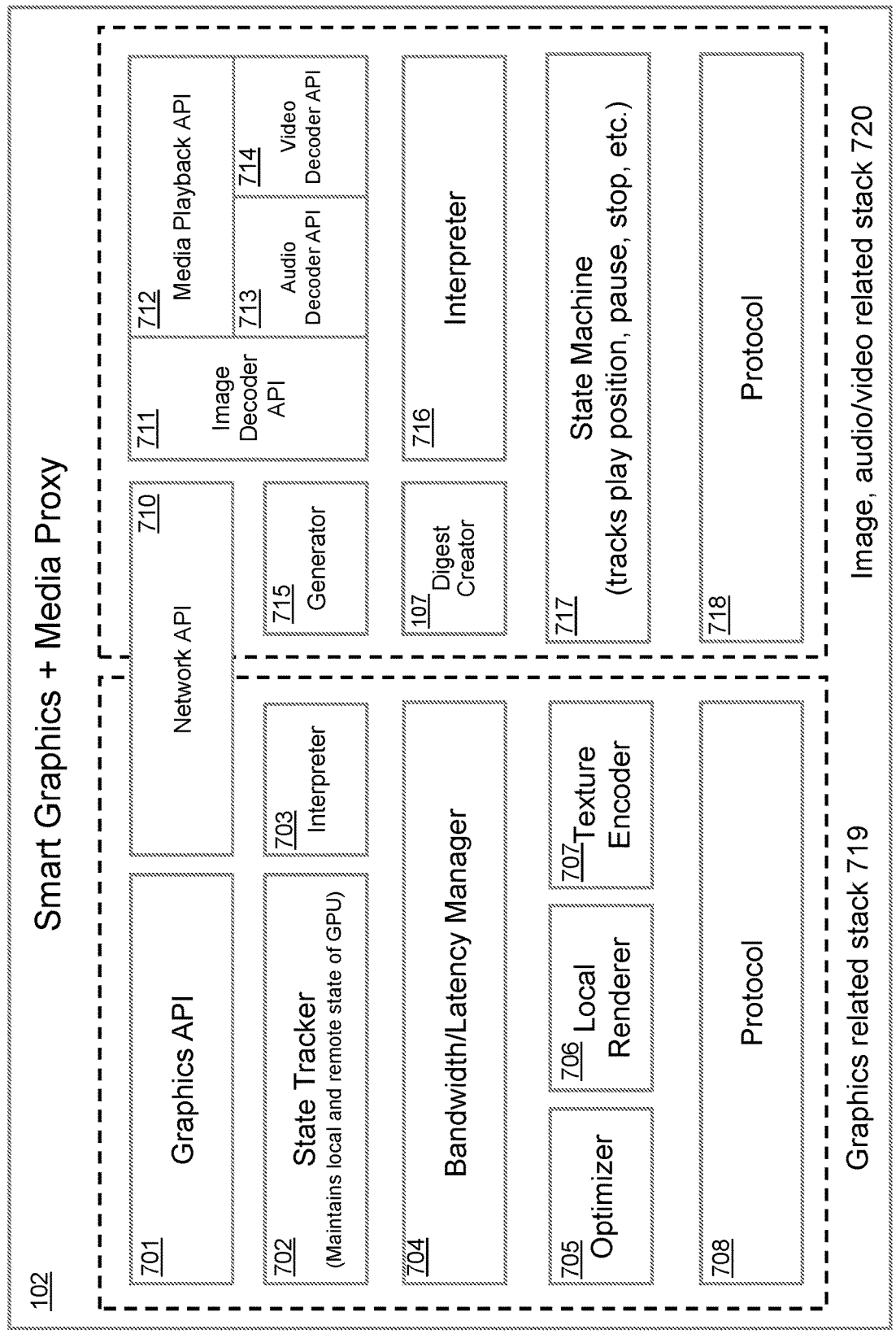
FIG. 7 is a block diagram of a SGMP component (e.g., sub-system), in accordance with some embodiments.

In some embodiments, as described in more detail below with respect to FIG. 2, commands to Get AV Segment 210 (e.g., commands from the SGMP 102 in the third-party application 101) to the client 130 cause the client 130 to get 211 audio/video segments 212 from a CDN 105, and cause the client to return an AV segment 2600 to digest creator 107 (e.g., via SGMP 102). Digest creator 107 generates the digest segment and sends the digest segment to be stored in media assets cache 106. In some embodiments, SGMP 102 receives the digest segment from the media assets cache 106 (e.g., or directly from digest creator 107). SGMP 102 reconstructs a reconstructed segment 811 from the digest segment by means of a generator 715 (FIG. 7). The third party application 101 receives 215, via a network API 710, the reconstructed segment 811 and plays 216 or decodes the reconstructed segment via a media playback API 712 as if it were the original segments. The reconstructed segments are parsed by the media playback API 712 to determine an instruction (e.g., an overlay to be displayed over the AV segment that is playing back at the client). The instruction 218 is forwarded to the client (e.g., where the instruction includes a references to the original segments 801). In some embodiments, the instruction includes an overlay or other user interface objects. The client decodes the received user interface objects, using its local decoder, to a display plane or a graphics texture and combines the user interface objects (e.g., graphics) In some embodiments, the overlay or other user interface objects are retrieved, at the server, from the graphics related stack 719 of the SGMP under the control of the SGMP.

Figure 2:
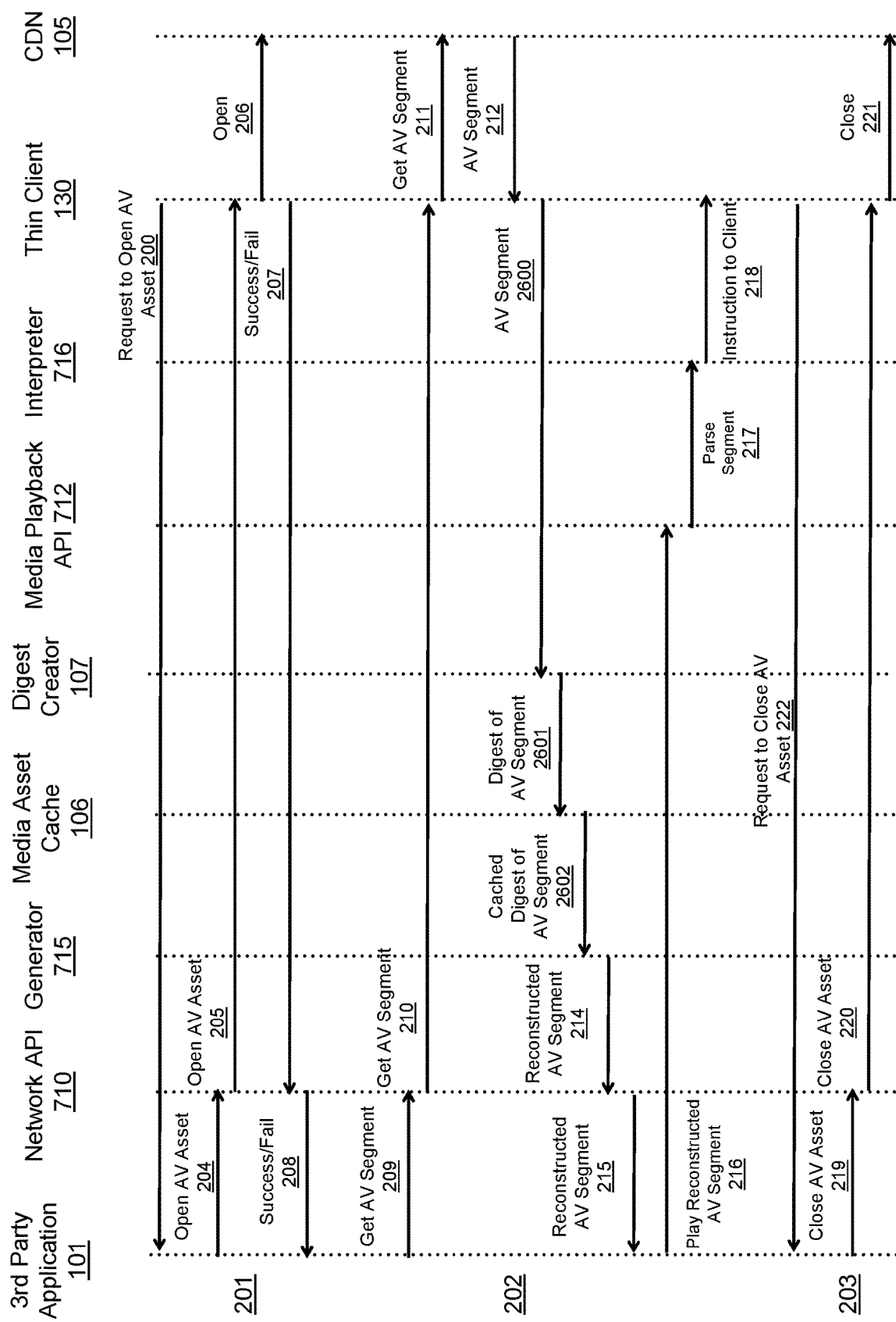
FIG. 2 is a state-flow diagram illustrating control and data flow for media content in the system between a third-party application, a smart-graphics-&-media-proxy (SGMP) sub-system, and a client device, in accordance with some embodiments.

FIG. 2 is a state-flow diagram illustrating control and data flow for media content in the system between a third-party application 101, media asset cache 106, and a client device 130, in accordance with some embodiments.

Operations shown in the region indicated by 201 pertain to a third-party application (e.g., application 101) that intends to start playback of a media asset that is authorized (e.g., by third-party backend 104) for streaming to client 130. To do so, application 101 first receives a user request to open an AV asset 200 (e.g., in response to a user input selecting an AV asset at the client 130). In response to receiving the request to open the AV asset, the third party application opens 204 the resource on the CDN, or issues a progressive download command, through the network API 710. Next, the network API issues an open-resource command 205 to the client 130. The client 130 then opens 206 the actual resource on the CDN 105 and returns a success/fail status 207 to the network API 710. The success/fail status 208 is passed on to the third-party application 101.

Operations shown in the region indicated by 202 include, after successfully opening the resource, the third-party application 101 requests segments 209 from the network API 710 which passes these requests 210 on to the client 130. The client gets 211 the segments from the CDN 105. Upon complete retrieval 212 of the segment from the CDN, the client forwards the segment 2600 to the digest creator 107. The digest creator creates a digest segment and sends the digest segment 3601 to be stored in media asset cache 106. An example of the generation of a digest segment out of a typical segment is given in FIG. 8.

FIG. 2 illustrates that from the cached digest segment 2602, the generator module 715 reconstructs the AV segment and sends, at 214, the reconstructed segment to the Network API 710. Depending on a type of application, the segment may be recreated to various degrees of accuracy. For example, the frames are reconstructed using random or pseudorandom data (e.g., dummy data). In some embodiments, the segment is an accurately reconstructed segment with elementary streams. For example, elementary streams (e.g., media streams defined by the MPEG communication protocol) may be available at the generator module 715 (e.g., from another source than the original segment) and the reconstructed segment can include these available elementary streams. The reconstructed segment is passed at operation 215, from the generator 715 through the network API 710, back to the third-party application 101. After various transformations (such as copying between buffers, in the process concatenating or fragmenting one or more segments), the third-party application passes 216 the transformed segment(s) to the media playback API 712. The media playback API passes 217 the segment(s) to an interpreter module 716. The interpreter module uses the reconstructed segment data to map segment(s) (e.g., synchronize the reconstructed segment(s)) to segment(s) stored by the client. The interpreter module 716 sends an instruction 218 to the client to play the respective stored segments.

Operations shown in the region indicated by 203 include closing the media asset by the third-party application 101 on the CDN 105. For example, third party application 101 receives a request to close the AV asset 222 (e.g., initiated by a user input at thin client 130), and in response to receiving the request to close the AV asset 222, third party application 101 sends a command 219 to close the AV asset, to the network API 710, which then instructs at 220 the thin client 130 to close the asset. The thin client 130 passes an instruction to CDN 105 to close 221 the asset. The skilled reader appreciates that for a stateless protocol such as for example HTTP, the open operation of the flowchart may represent the retrieval of metadata about the audio/video asset, such as for example the asset's MPEG-DASH manifest and that the asset is implicitly closed.

Figure 3:
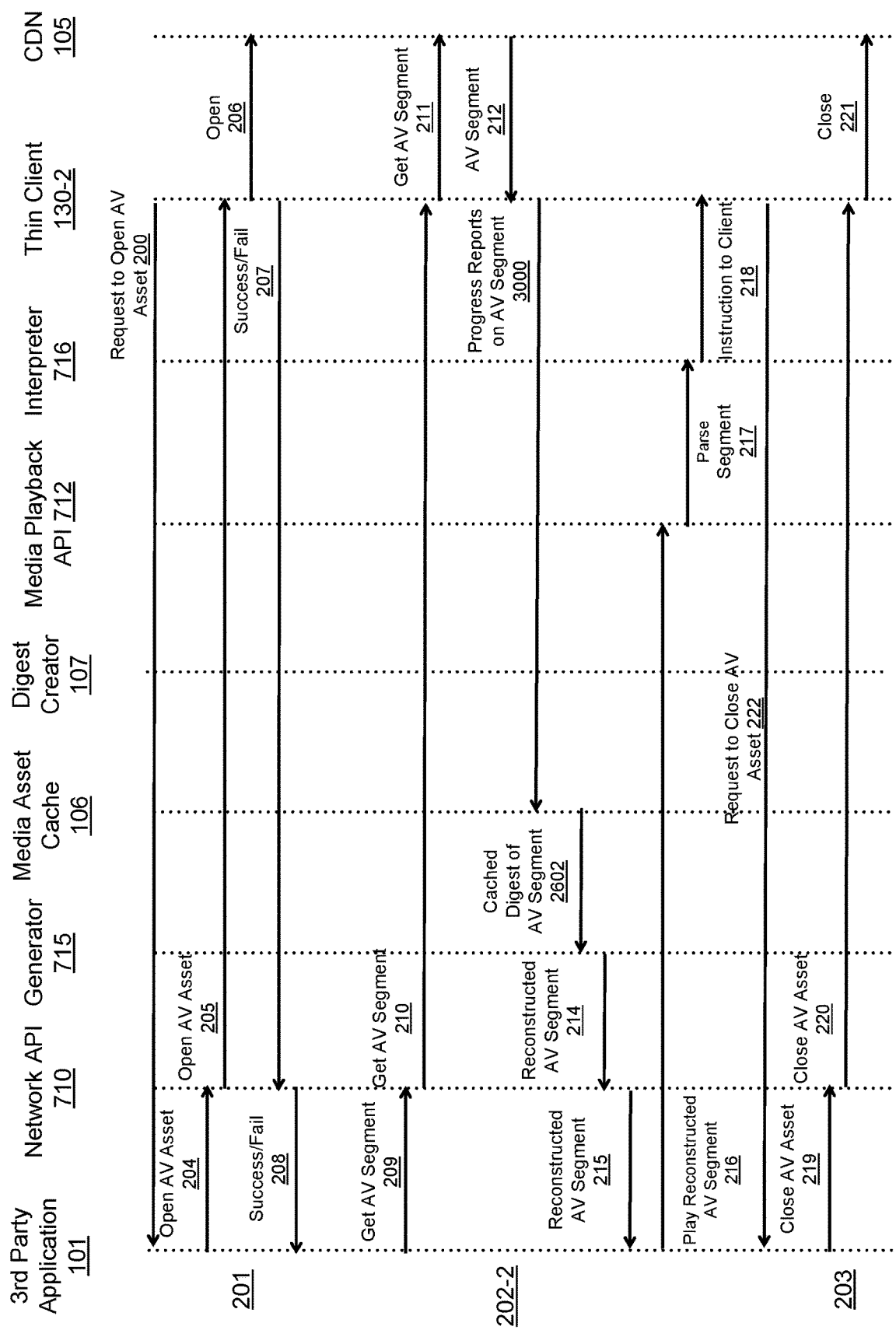
FIG. 3 is a state-flow diagram illustrating control and data flow for media content in the system between a third-party application, the SGMP sub-system, and a client device, in accordance with some embodiments.

FIG. 3 is a diagram that illustrates transformation of a video segment into a digest segment and reconstruction of the digest segment into a reconstructed segment, in accordance with some embodiments. It will be noted that the open operations 201 and the close operations 203 are equivalent to the operations described with reference to FIG. 2.

As illustrated in FIG. 3, in some embodiments, thin client 130-2 is playing back the same media segment as thin client 130 (e.g., at a later time, which may or may not overlap with the playback of the media segment at thin client 130), as explained in FIG. 2. For example, because thin client 130-2 requests a media segment that is associated with an existing digest segment (e.g., the digest segment created in FIG. 2), client 130-2 does not pass the segment to digest creator 107. Instead, client 130-2 passes progress reports 3000 (e.g., indicating playback position of the media segment at thin client 130-2) to media asset cache 106. In some embodiments, the server system performs a lookup to determine whether a digest segment has already been generated and/or stored in media asset cache 106. Media asset cache 106 uses the progress reports to access the cached digest segment of the media segment and sends the digest segment 2602, which was stored in media asset cache 106, and provide it to generator 715. Generator 715 reconstructs the segment from the digest segment received from the media asset cache 106 (e.g., by maintaining segment headers and filling in the segment with dummy data). The generator 715 sends the reconstructed segment 214 to the network API 710. Network API 710 is able to process the reconstructed segment as if it received the full media stream segment (e.g., even though the reconstructed segment includes frames of dummy data and does not include frames of video data). The network API 710 is thus tricked into processing the reconstructed segment and sends 215 the segment to third party application 101. In some embodiments, third party application 101 adds media assets (e.g., overlays). Third party application 101 plays the reconstructed segment and sends the reconstructed segment 216 to media playback API 712. The media playback API 712 parses the segment 217 and sends it to the interpreter, which determines an instruction, such as an overlay, to be displayed at a particular playback point within the AV segment (e.g., as determined from the parsed segment). The interpreter 716 sends the instruction 218 to the client 130-2 (e.g., the instruction including an overlay and/or an instruction for the client to playback the AV segment with the overlay).

FIGS. 2 and 3 illustrate how separation of control and data is achieved, in accordance with some embodiments. For example, the application 101 uses APIs, such as the network API 710, media playback API 712, image decoder API 711 and graphics API 701 to control the retrieval and processing of graphics, audio and video data. In some embodiments, instead of operating on the actual data of the assets from the CDN 105, the control is transferred (remoted) to the client 130 and the client retrieves and processes the data on behalf of the application in its own domain, thus leveraging its geographically favorable position relative to the CDN 105 to do so.

Since standardized APIs used by application 101 typically require actual data to be passed as argument or returned as result, there is a need to have equivalent data, for example, provided in the form of a reconstructed digest segment (e.g., an equivalent number and/or size of segments and/or frames of video data, such as "dummy data") available for the application 101 to process so that the application can perform its control responsibility. In this way, the application need not be modified to operate within the systems described herein. For example, video data is typically DRM protected and only a protected part of the media playback stack processes this data during the decode process of the video data. Since this processing and decoding functionality is typically not a function of the application itself, it can be performed by the client on behalf of the application.

Figure 4:
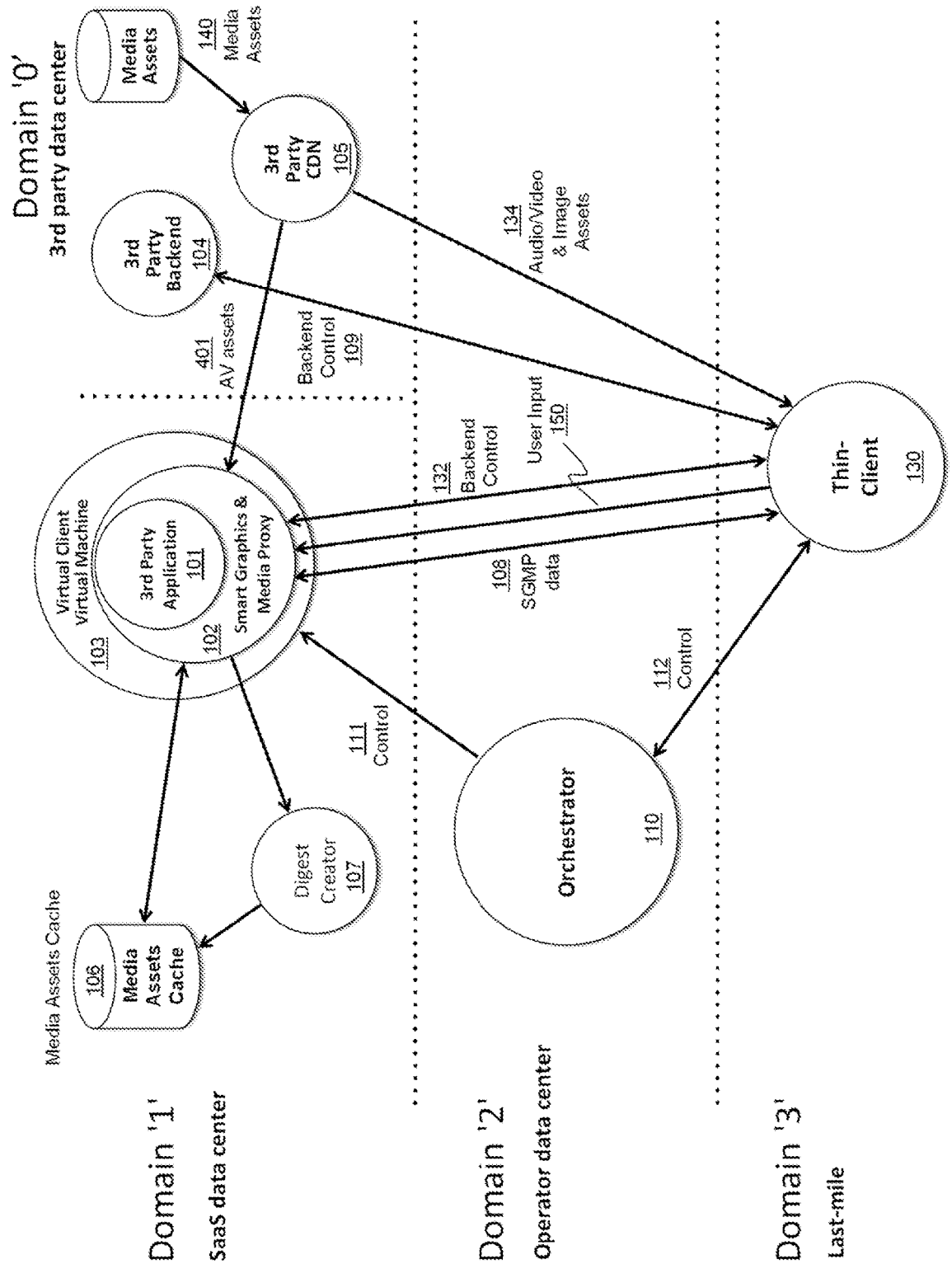
FIG. 4 is a top-level diagram illustrating a virtualized app server system with the addition of a Media Asset Cache and a Digest Creator. In this embodiment, a content delivery network (CDN) directly sends content to a Virtual Client Virtual Machines (VCVM) for storage in the Media Asset Cache, in accordance with some embodiments.
Figure 5:
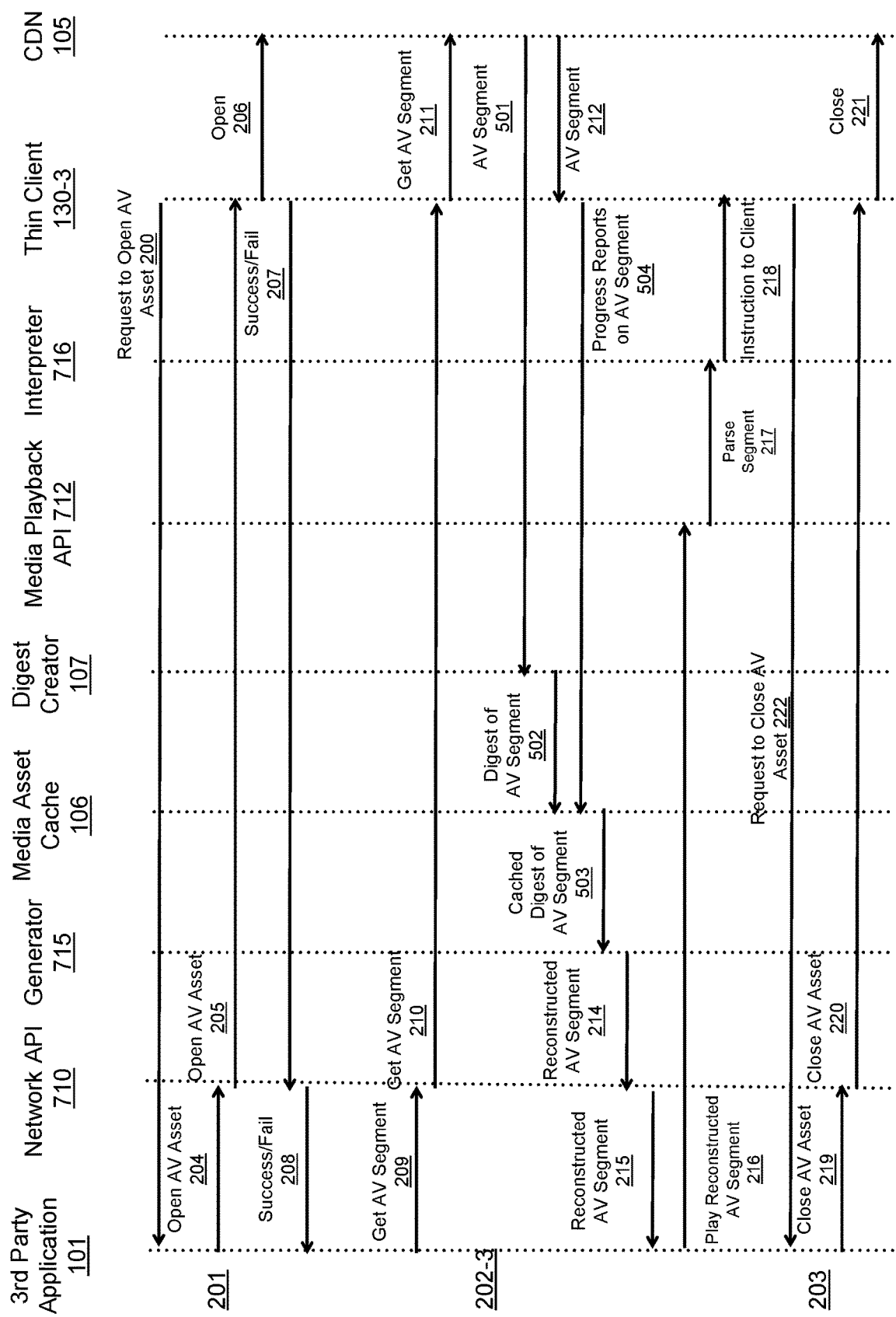
FIG. 5 is a state-flow diagram illustrating control and data flow for media content in the system between a third-party application, a VCVM, and a client device, in accordance with some embodiments.
Figure 6:
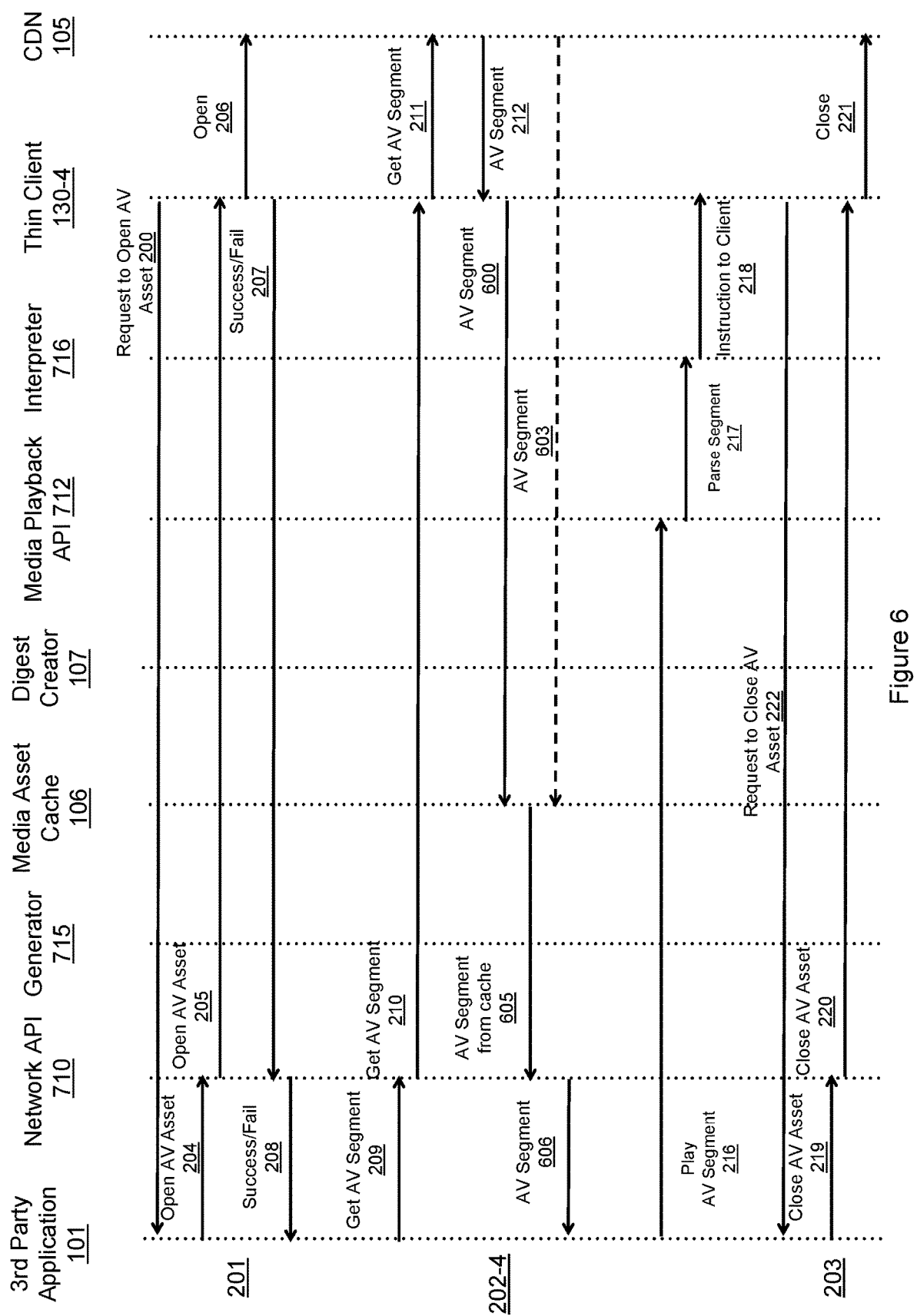
FIG. 6 is a state-flow diagram illustrating control and data flow for media content in the system between a third-party application, the VCVM sub-system, and a client device, in accordance with some embodiments.

FIG. 4 is a top-level diagram illustrating a content delivery system, in accordance with some embodiments. Components of the content delivery system operate within four domains, as explained with reference to FIG. 1. In FIG. 4, Domains 0-4 operate similarly to the domains explained in FIG. 1. However, in FIG. 4, audio/video (AV) assets 401 are passed from the third party CDN 105 in domain 0 directly to the SGMP 102 in domain 1. It will be understood that the SGMP 102 can thus receive AV assets directly from third-party CDN 105 (as illustrated in FIG. 4) and/or from thin client 130 (e.g., AV assets 134 passed from CDN 105 to thin client 130 and then forwarded to VCVM 103). For example, as illustrated in FIGS. 1 and 4, thin-client 130 receives audio-video and image assets 134 from third party CDN 105 and forwards (e.g., via SGMP data 108) the audio/video and image assets (e.g., unmodified) to SGMP 102. In response to receiving the audio/video and image assets, SGMP 102 passes the unmodified assets to digest creator 107, to create a digest segment to be stored in media assets cache 106. FIGS. 2 and 3 illustrate flow diagrams in which the third-party application 101 (e.g., SGMP 102) receives the media assets (e.g., AV segments) from thin client 130. FIGS. 5 and 6 illustrate flow diagrams in which the third-party application 101 receives the media assets directly from CDN 105 (e.g., without having the media assets forwarded from thin client 130).

FIG. 5 illustrates a state-flow diagram illustrating control and data flow for media content in the system between a third-party application 101, media asset cache 106, and a client device 130-3, in accordance with some embodiments. FIG. 5 illustrates the data flow for the system illustrated in FIG. 4 in which the AV assets are received at the server system directly from CDN 105. The process for opening an AV asset 201 and closing an AV asset 203 is described above with reference to FIG. 2. The process 202-3 shown in FIG. 5 is different than the process 202 described in FIG. 2 because the CDN 105 sends AV segments 501 directly to the server system. For example, in FIG. 5, CDN 105 receives the request to get AV segment 211 from thin client 130 (after thin client 130 received the request to get AV segment 210 from the $3^{rd}$ party application 101). In response to the request 211, CDN 105 sends the AV segment 501 directly to digest creator 107 (e.g., at the server system) and, also sends the AV segment 212 to thin client 130-3. In this way, both thin client 130-3 and the digest creator 104 of the server system receive the AV segment from CDN 105. In addition, thin client 130-3 sends progress reports for playback of the AV segment 504 from thin client 130-3 to media asset cache 105.

After digest creator 107 receives the AV segment 501, digest creator 107 generates a digest segment of the AV segment (e.g., where the digest segment removes image/frame data of the AV segment and includes header information, and optionally, blank frames of data), and sends the digest segment of AV segment 502 to the media asset cache 106. The media asset cache 106 stores the digest segment of AV segment (e.g., with an identifier indicating that the digest segment is a digest for AV segment 501). Thin client 130-3, while playing back the AV segment 212 received from CDN 105, sends progress reports 504 representing a current playback position of the AV segment 212 at the client device 130-3. Based on the progress reports 504 indicating the current playback position of the AV segment, the generator 715 retrieves the cached digest segment of the AV segment 503 that is stored at media asset cache 106 corresponding to the current playback position of the AV segment, and generates a reconstructed (e.g., and/or fingerprinted) AV segment 214 to send to the network API, which then feeds the reconstructed AV segment 215 to the $3^{rd}$ party application. For example, the reconstructed AV segment includes fingerprinted identifiers (e.g., for each frame in the reconstructed media stream segment) that are used to synchronize the reconstructed AV segment with the original media stream segment. In some embodiments, the reconstructed and fingerprinted AV segment 214 is a reconstructed digest segment, which includes the header information of the digest segment and also includes dummy data (e.g., additional data). For example, the reconstructed AV segment is reconstructed in order to expand the digest segment (stored at media asset cache 106) to be a same length as the AV segment playing back at thin client 130-3. Thus, when third party application 101 receives the reconstructed AV segment 215, the third party application 101 is tricked into performing its functions (e.g., generating and/or adding overlays or other graphical elements) on the reconstructed AV segment as if it were performing the functions on the unmodified AV segment that is playing back on the client device. The third party application 101 is thus able to execute unmodified at the virtual machine in the server instead of executing on a client device. The processing power required by the client device is thus significantly decreased.

As explained with reference to FIG. 2, the third party application plays the reconstructed AV segment 216 (e.g., as if it were the unmodified AV segment itself) and sends the reconstructed AV segment to media playback API 712, which is able to parse the segment 217 and send it to interpreter 716, which provides instructions 218 to the thin client 130-3 to play the AV segment (e.g., to display the AV segment with an overlay that is included in instruction 218).

FIG. 6 is a state-flow diagram illustrating control and data flow for media content in the system between a third-party application 101, media asset cache 106, and a client device 130-4, in accordance with some embodiments. The processes to open AV assets 201 and close AV assets 203 illustrated in FIG. 6 are the same as the processes described above with reference to FIG. 2. In FIG. 6, client device 130-4 is playing an AV segment 212 (e.g., a same AV segment played back at client device 130-3 (shown in FIG. 5)). CDN 105 in FIG. 6 sends AV segment 600 directly to media asset cache 106, bypassing digest creator 107. In this way, the unmodified AV segment is stored in the media asset cache 106 (e.g., instead of generating and storing a digest segment for the AV segment). For example, in FIG. 6, network API 710 receives the AV segment from the cache 605 and sends the unmodified media segment 606 to the third party application.

FIG. 6 also illustrates how media asset cache 106 receives the AV segment from thin client 130-4 and/or directly from CDN 105. For example, AV segment 212 is sent from the CDN 105 to thin client 130-4, which then forwards the AV segment 600 to media asset cache 106. In some embodiments, the media asset cache optionally receives AV segment 603 directly from CDN 105. It will be understood that the media asset cache 106 can receive the unmodified AV segment from the client, from the CDN, or from both. By storing an unmodified version of the AV segment in media asset cache 106, when another client device (or the same client device) requests to play back the same AV segment that is already stored in the media asset cache, the client device and/or CDN forgo sending the full AV segment to the server. For example, once the server has the unmodified AV segment stored in its cache, it only requires progress reports from a client device to maintain synchronization with the client device without requiring the full media stream segment to be sent to the server. This reduces the bandwidth required for any subsequent client device playing back the AV segment that has already been stored in media asset cache 106.

FIG. 7 is a block diagram of an SGMP component (e.g., SGMP 102), in accordance with some embodiments. SGMP 102 includes graphics related stack 719, interpreter 703, bandwidth/latency manager 704, optimizer 705, local renderer 706, texture encoder 707, and/or protocol module 708; and the media (e.g., image, audio, and/or video) related stack 720 with modules including image decoder API 711, media playback API 712, audio decoder API 713, video decoder API 714, generator 715, interpreter 716, state machine 717 (e.g., to track play position, pause, stop, etc.), and/or protocol module 710. Network API 710 facilitates communication between components of SGMP 102 and remote devices (e.g., client device 130).

In some embodiments, Graphics API module 701 implements a graphics API (e.g., OpenGL (for example, Open GL ES 2) and/or DirectB). Graphics API module 701 implements functions specific to the API, such as: API function definitions, non-state-dependent error checking, non-state-dependent queries, system integration functions, and/or system queries.

In some embodiments, state tracker module 702 processes function calls passed on from the graphics API module 701 and maintains a state model of the display state of the remote application 101 which is providing service to a client 130 in domain 3. The state tracker module also maintains a model of the display state of the client. By way of example, for certain events when a call would cause changes to the client's frame buffer that would be seen by a user, a difference between the virtual state and the state of the real (remote) GPU, maintained by the state tracker 702, is determined and forwarded as an update to the bandwidth manager 704.

Another purpose of the state tracker 702 is as a first filter to prune superfluous API calls. It is well known to the skilled person that graphics APIs (such as OpenGL) may be stateful APIs, meaning that a series of calls is required to perform certain functions. Subsequent calls are inter-dependent. Applications typically implement some form of state management that usually generates a considerable amount of superfluous calls to set a state or return to a known state before setting the next state. By keeping a model of that state in 702, a canonical state change can be generated once a function is actually performed. This not only is a reduction in the amount of state changes (hence data), it also simplifies the implementation of the other modules of the graphics related stack 719 of the SGMP. The maintenance of the state of the idealized GPU, as kept by 702, plays a key role in mitigating the high-latency properties of the link. By maintaining this complete model of the state locally in 702, any query with respect to that state can be satisfied locally and hence avoid a situation where the actual (remote) GPU needs to be queried with the attendant latency penalty.

In some embodiments, bandwidth/latency manager 704 module keeps track of the available bandwidth and incurred latency. If the update fits the available bandwidth and latency profile, the update is passed on to the optimizer 705 and texture encoder 706, along with parameters that allow these modules to rework the intended update to the client device 130 to fit the available bandwidth and/or latency requirements. If the update does not fit the bandwidth/latency profile, the update may be rejected, and the state tracker's 702 virtual state difference will accumulate the missed updates and frames which then may be skipped in order to resynchronize the remote application 101 with the client 130.

In some embodiments, optimizer module 705 processes the updates of state difference between the virtual (idealized) state and the real state in the client, and determines what transformations can be made to reduce the size of the update by, for example only and without limitation, reordering operations within the remote application to minimize state changes, leveraging additional client extensions not used by the application, performing operations locally and generating intermediate textures instead of sending all textures (components of a graphic scene) to the client 130 and combining them there or, postponing operations in case of bandwidth shortage.

The optimizer 705 may determine that performing operations locally and generating intermediate textures within the graphics related stack 719 may be more optimal than sending all textures to the client 130 and perform these operations client-side. A self-contained chunk from the update from the optimizer 705 module is used to produce a texture that is equivalent to a texture that would have been generated on the client 130 had the individual textures and chunk from the update been sent to the client. Instead of sending the textures and chunk to generate the texture client-side, the generated texture is sent.

In some embodiments, local renderer module 706 may be used to generate a local representation of a frame-buffer if texture read back is required or if vertex transform feedback is used. Occasionally, applications read back rendered texture material. Although this is very uncommon because it is also an inefficient operation when the GPU is not virtualized. For determining which textures are located within the display area, the Optimizer module 705 may use the Local Renderer 706 to run vertex shaders.

In some embodiments, texture encoder 707 works in conjunction with the optimizer module 705 to transform the state update to fit the bandwidth/latency profile as specified by the bandwidth manager. In some embodiments, optimizer module 705 performs functions such as: (1) encoding texture pixels to encoded images to reduce the amount of data that needs to be transmitted to the client; (2) texture scaling to further reduce the amount of data; and/or (3) caching of already encoded texture.

Graphics APIs often handle raw and/or lightly compressed texture material. In some embodiments, to reduce the amount of data that needs to be transmitted to the client, the material is (re)compressed to allow for transmission over low-bandwidth links. In some embodiments, when a texture has an alpha channel, the texture is compressed with an image codec that supports an alpha channel (e.g., the portable-network-graphics (PNG) format). In some embodiments (e.g., when a texture is a natural image) a lossy compression algorithm, such as the joint-photographic-experts-group (JPEG) image format, is used (e.g., to reduce the bandwidth required to transfer the image without a user-perceivable loss in quality). In some embodiments, computer-generated images (such as for example material representing text, gradients, etc.) are stored using an image format such as PNG. The Texture Encode module 707 processes the texture material and determines a codec to apply.

When a lossy codec is selected by the texture encode module 707, the texture encoder 707 module must determine what level of quantization (reduction in quality or loss in fidelity) is required to meet the bandwidth profile, while minimizing the degradation of fidelity as much as possible. An image format such as WebP that can be used to encode textures both lossless or lossy would serve both lossy and lossless scenarios. The decision can be augmented by information from the optimizer 705 about the texture's role.

Applications may not always provide optimal texture sizes. For example, it is not uncommon to use a texture that is larger than it will appear on screen. Rescaling the texture to an appropriate size may not only reduce the bandwidth required to transfer the texture material, it may also improve fidelity because more advanced scaling filters can be applied server-side than may be available client-side.

The texture encoder 707 module uses a cache of encoded textures. If texture material has been encoded before, it may be available from the cache. This significantly increases scalability. Texture analysis and compression are CPU intensive operations. If the analysis and compression can be avoided (by hashing the texture material and metadata and checking whether an encoded version is available in the cache), a significant scalability advantage can be achieved. Note that this cache may be shared between other instances of the texture encoder 707 to further increase cache efficiency.

In some embodiments, protocol module 708 implements the protocol that transforms the structured data from the optimizer 705 and texture encoder 707 modules into actual bytes, then compresses the data and sends it as protocol messages to the client 130. It also receives messages from the client, primarily during the connection setup to determine the client's capabilities.

Figure 8:
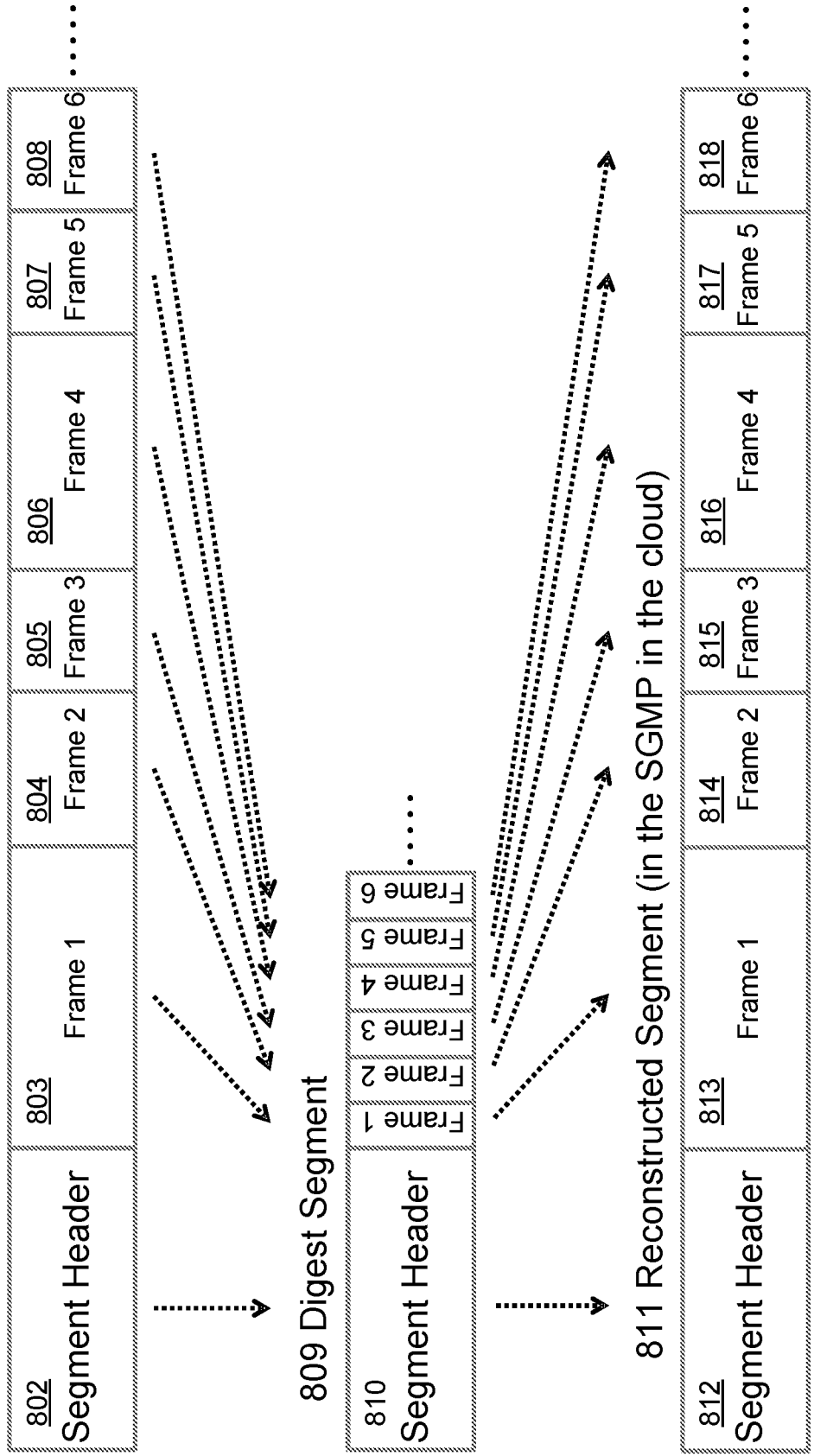
FIG. 8 is a diagram that illustrates the transformation of a video segment into a digest segment and its reconstruction into a reconstructed segment, in accordance with some embodiments.
Figure 9B:
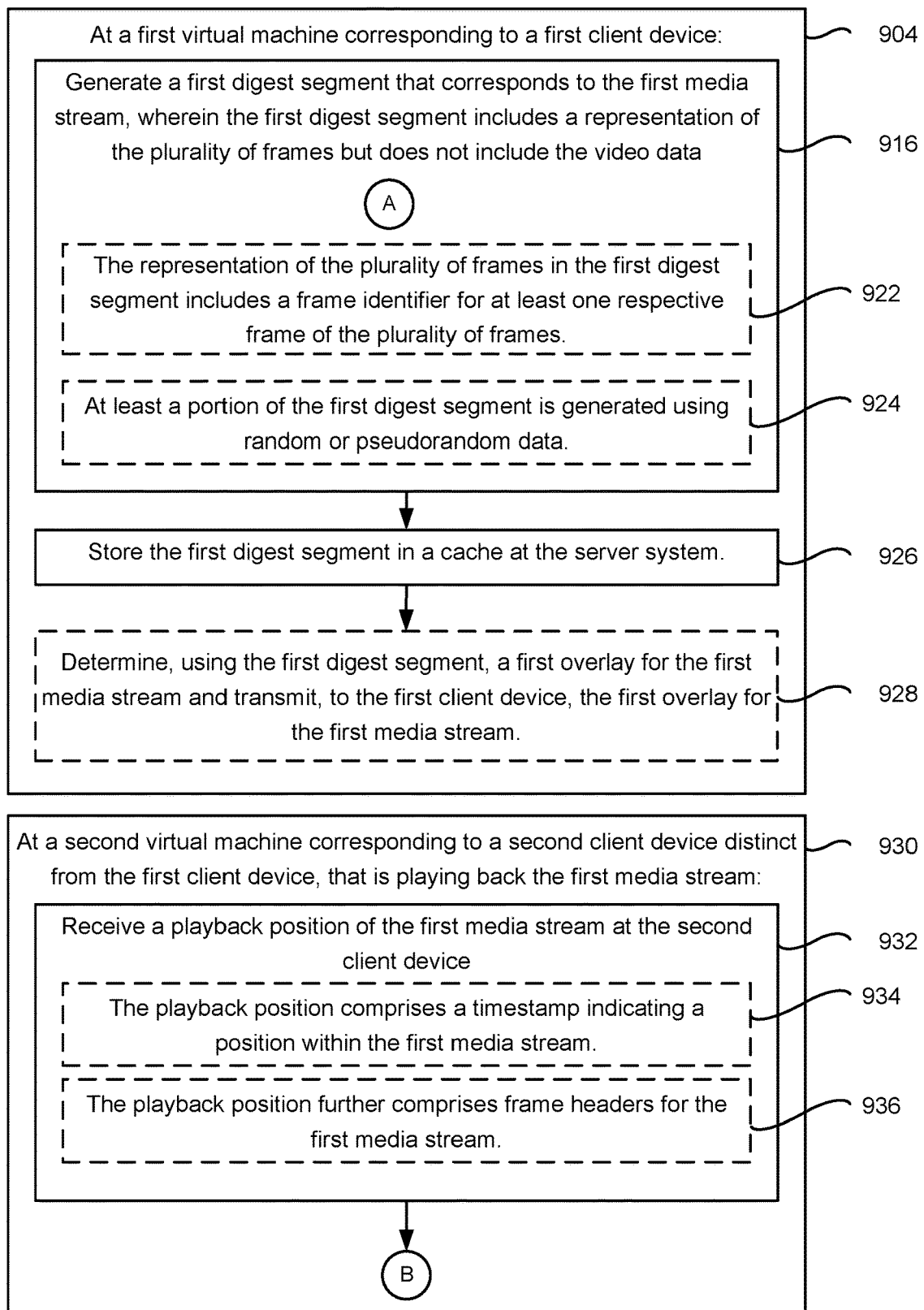
Figure 9E:
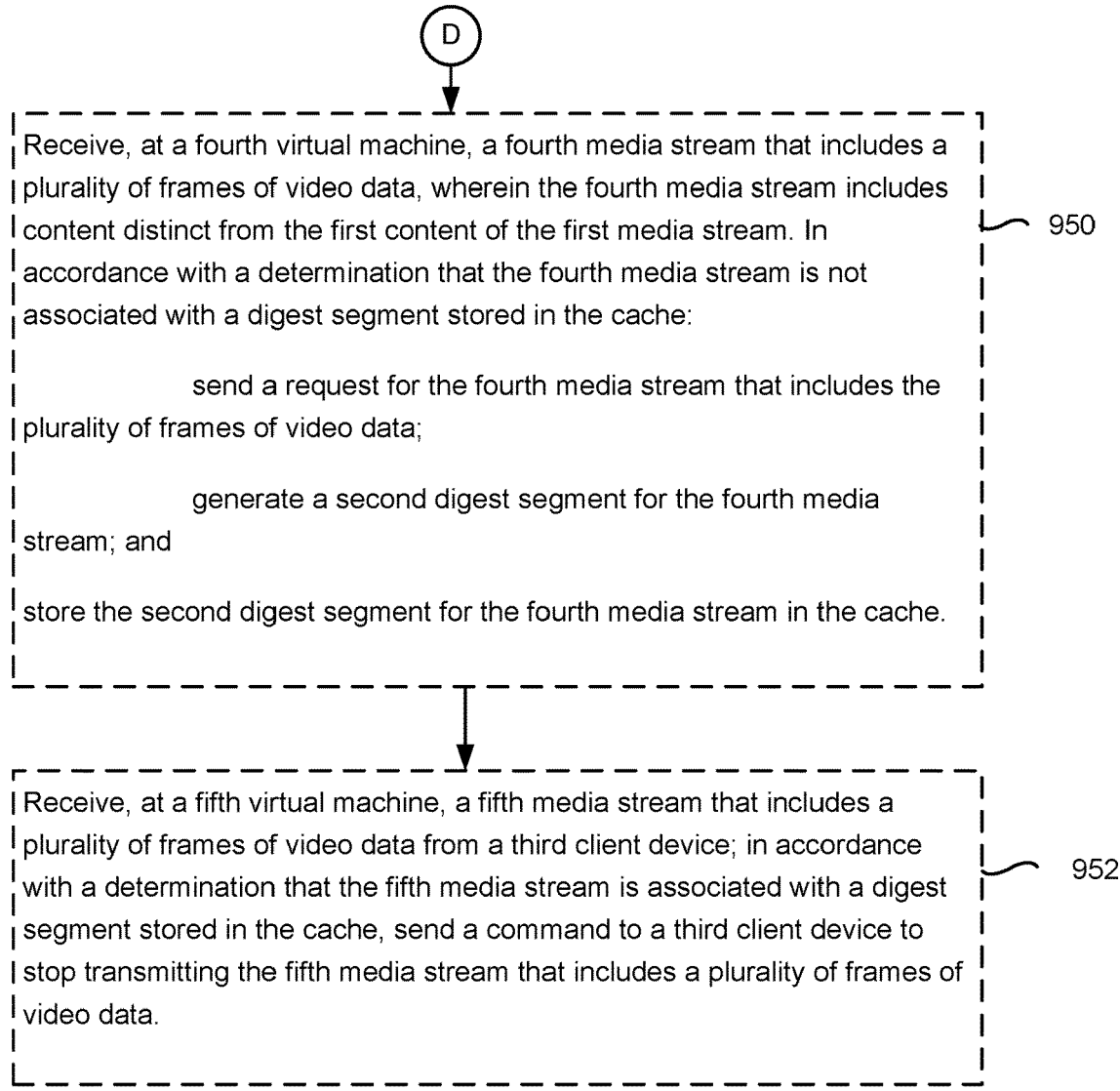

FIG. 8 illustrates an example of generation of a digest segment 809 and a reconstructed segment 811. In some embodiments, original segment 801 is obtained from client device 130. For example, client device 130 forwards original segment 801 to a respective VCVM 103 associated with the client (e.g., as illustrated in FIG. 1). In some embodiments, original segment 801 is obtained from third party CDN 105. For example, third party CDN 105 sends original segment 801 directly to SGMP 102 at the respective VCVM (as illustrated in FIG. 4). Original Segment 801 depicts a hypothetical segment, such as, by way of example only, an ISO base-media file-format (BMFF) segment as used in MPEG-dynamic-adaptive-streaming over HTTP (MPEG-DASH). Such a segment consists of a segment header 802 (e.g., which also corresponds to segment headers 810 and 812) and several frames, in this example, 803 to 808. It should be appreciated that the bulk of the segment data typically is the DRM-protected frame data. In some embodiments, the digest segment of the segment 809 is formed by removing the DRM-protected frame data and only including in the digest segment 809 the unmodified segment header (e.g., segment header 810 corresponds to unmodified segment header 802) and/or frame headers (such as picture headers and slice headers), including any codec specific headers, such as for example sequence headers, that are required to make an accurate reconstruction of the sequence of frames by the generator 715.

Figure 10:
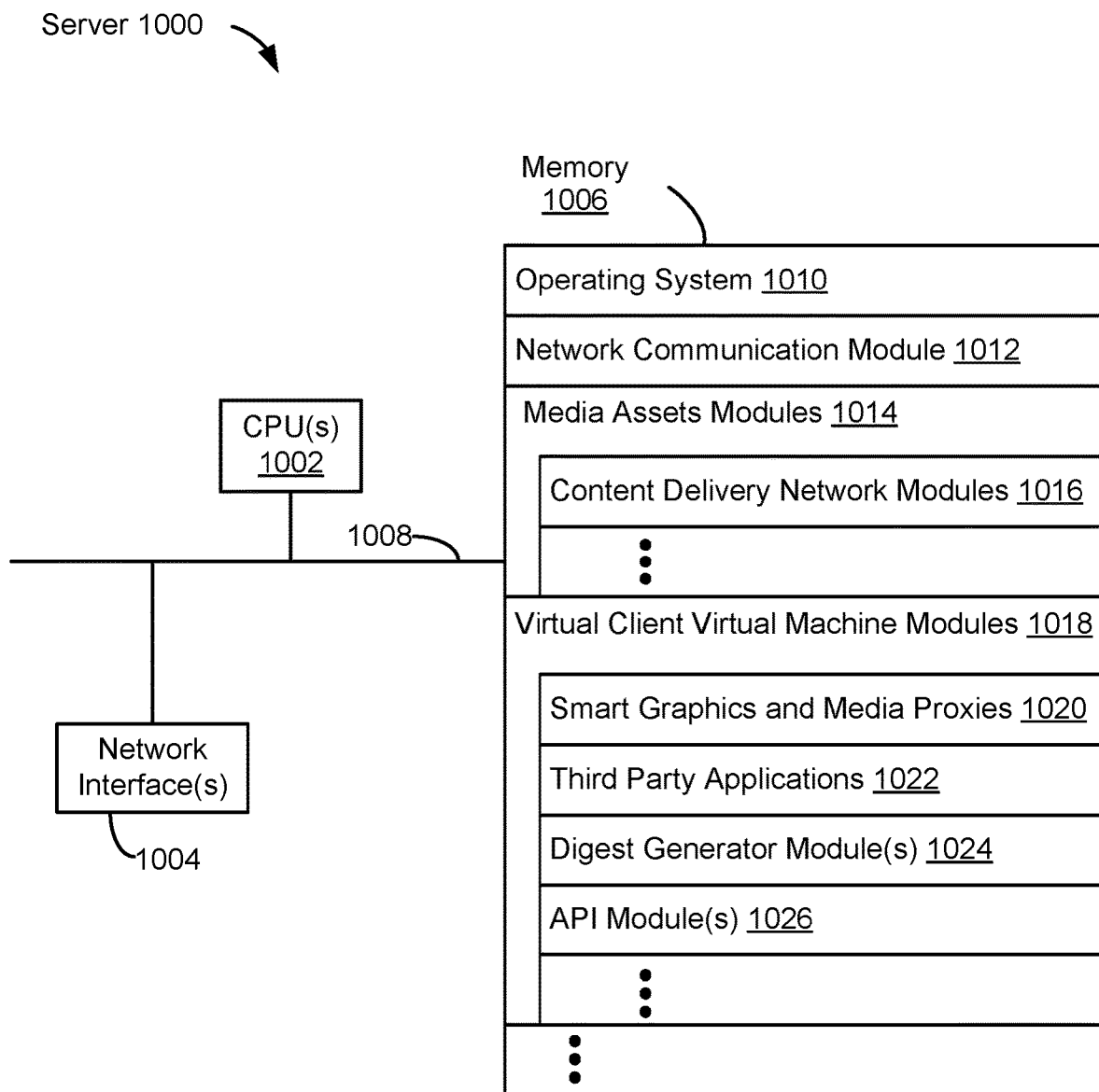
FIG. 10 is a block diagram of a server system, in accordance with some embodiments.

FIGS. 9A-9E illustrate a method 900 for providing a playback command to a client device. In some embodiments, the method 900 is performed by a server computer system 1000 that hosts (902) one or more virtual machines, each virtual machine associated with a respective client device of one or more client devices for playback of media streams, as shown in FIG. 10. For example, instructions for performing the method are stored in the memory 1006 and executed by the processor(s) 1002 of the server computer system 1000. Some operations described with regard to the process 900 are, optionally, combined and/or the order of some operations is, optionally, changed. The server computer system (e.g., a server computing device) has one or more processors and memory storing one or more programs for execution by the one or more processors. In some embodiments, each client device of the one or more client devices is a thin client programmed to remote into a server-based computing environment.

In some embodiments, a first virtual machine receives a request, from a client device, for a first media stream. In some embodiments, in response to receiving the request for the first media stream, the first virtual machine performs a lookup to determine whether the first virtual machine has access to a digest segment for the first media stream. For example, the first virtual machine determines whether a digest segment for the first media stream is stored in media asset cache 106 at the server system. In some embodiments, the first virtual machine determines that the media asset cache does not include a digest segment for the first media stream, and sends a request to the client (or the CDN) to transmit the first media stream to the virtual machine. In some embodiments, the first virtual machine determines whether it has access to a digest segment for the first media stream before receiving the first media stream that includes first content. For example, if the first virtual machine already has access to a digest segment for the first media stream, the first virtual machine sends an instruction to the client device (or the CDN) to forgo transmitting the media stream to the first virtual machine. For example, the method 900 is performed in accordance with a determination that the first virtual machine does not have access to a digest segment for the first media stream.

A first virtual machine corresponding to a first client device (904) receives (906) a first media stream that includes first content corresponding to a plurality of frames of video data. In some embodiments, the video data comprises (908) image content in each frame of the plurality of frames in the first media stream. For example, the first media stream corresponds to original segment 801, shown in FIG. 8.

In some embodiments, the first media stream is received (910) from the first client device. For example, as illustrated in FIGS. 1-2, the first media stream is received from client device 130.

In some embodiments, the first media stream is received (912) from a content provider. For example, as illustrated in FIGS. 4-5, CDN 105 sends AV assets 2801 directly to VCVM 103 (e.g., thin client 130-3).

In some embodiments, the first virtual machine determines (914) that there is not a digest segment stored in the cache (e.g., media assets cache 106) corresponding to the first video stream. In some embodiments, the generating and storing are performed in accordance with the determination that there is not a digest segment stored in the cache corresponding to the first video stream. For example, in some embodiments, media assets cache 106 stores digest segments for one or more media stream segments after the one or more media stream segment is received at VCVM 103. In some embodiments, the digest segments are stored for a predetermined amount of time (e.g., a week, a month, etc.). In some embodiments, digest segments are stored in the media assets cache indefinitely. For example, a library of digest segments is stored in the media assets cache 106 such that when a client device is playing back a media segment, a digest segment for the media segment is accessible from the media assets cache.

The first virtual machine generates (916) a first digest segment that corresponds to the first media stream. The first digest segment includes a representation of the plurality of frames but does not include the video data. A digest segment is a compilation or summary of material or information from the plurality of frames (e.g., in the media stream that does not include the data of the media stream). For example, the digest segment 809 shown in FIG. 8 illustrates a digest segment that includes a segment header 810, but has stripped out frame data included in frames 803 through 808 from the original segment 801.

In some embodiments, the representation of the plurality of frames in the first digest segment includes (918) a segment header for the first media stream. For example, segment header 810 shown in FIG. 8. In some embodiments, the representation of the plurality of frames in the first digest segment includes (920) at least one respective frame header that corresponds to a respective frame of the plurality of frames. For example, in addition to (or instead of) the segment header 810, the digest segment includes frame headers for one or more frames in the original segment 801. In some embodiments, the representation of the plurality of frames in the first digest segment includes (922) a frame identifier for at least one respective frame of the plurality of frames. For example, each frame includes a frame identifier indicating its position (e.g., frame 1).

In some embodiments, at least a portion of the first digest segment is generated (924) using random or pseudorandom data. For example, as illustrated in FIG. 8, at least a portion of digest segment 809 includes random or pseudorandom data (e.g., data that does not include image or video data that is present in the frames of original segment 801). For example, "frame 1" includes random data instead of including video data present in frame 1 of original segment 801.

The first virtual machine stores (926) the first digest segment in a cache at the server system. In some embodiments, the cache (e.g., media asset cache 106) is stored at the server system. In some embodiments, each virtual machine is enabled to access the cache. For example, the cache is stored in memory that is shared and accessible by the one or more virtual machines hosted at the server system. In some embodiments, the first virtual machine stores the first digest segment in association with a first identifier (e.g., representing the first media stream segment). For example, each digest segment is associated with a respective identifier such that the one or more virtual machines is able to identify when a digest segment has already been generated for a respective media stream segment. In this way, digest segments only need to be created when the server system does not already have a digest segment stored for a requested media stream segment.

In some embodiments, the first virtual machine determines (928), using the first digest segment (e.g., by generating a first reconstructed media stream segment from the first digest segment), a first overlay for the first media stream and transmits, to the first client device, the first overlay (e.g., and/or an instruction to display the first overlay) for the first media stream. In some embodiments, the first overlay includes affordances corresponding to playback commands. For example, the first overlay includes graphical elements (e.g., affordances) generated by the API of a native application executing at the server system.

A second virtual machine corresponding to (930) a second client device distinct from the first client device, that is playing back the first media stream receives (932) a playback position of the first media stream at the second client device. In some embodiments, the received playback position includes an identifier (e.g., the first identifier associated with the first media stream segment). In some embodiments, in response to receiving the identifier, the second virtual machine performs a lookup in the cache to determine whether a digest segment is stored in the cache.

In some embodiments, the playback position comprises (934) a timestamp indicating a position within the first media stream.

In some embodiments, the playback position further comprises (936) frame headers for the first media stream.

The second virtual machine uses (938) the playback position from the second client device and the first digest segment stored in the cache to perform processing to recreate a representation of the playback of the first media stream on the second client device.

In some embodiments, processing to recreate the representation of the playback of the first media stream on the second client device comprises (940) using the first digest segment, stored in the cache, to generate a second reconstructed media stream based on the first digest segment, wherein the second reconstructed media stream includes dummy data (e.g., additional data that does not include the video data in the plurality of frames) that is distinct from the video data. In some embodiments, the second reconstructed media stream segment has a same length (e.g., data size) as the first media stream. For example, the second reconstructed media stream is a same length as the first media stream so that the virtual machine can feed the API of the application executing at the virtual machine and trick the API into processing the second reconstructed media stream as if the API had received the unmodified version of the media stream. Thus, the application (and the API) are executed at the virtual machine without modification, as if the application were running on the client device. This reduces the processing power required by the client device by allowing native applications to be executed in a cloud server system.

In some embodiments, the server system reconstructs the first digest segment for each client that plays the first media stream. For example, in response to a third client device playing back the first media stream segment, a third virtual machine corresponding to the third client device accesses the first digest segment from the cache (e.g., instead of re-generating a digest segment). This reduces the bandwidth used because any subsequent clients (e.g., after the digest segment has been generated and saved in the cache) does not transmit the full media stream segment to the server system. Instead, the server system is able to identify the digest segment and, for each subsequent client, reconstruct a media stream that includes dummy data in order to determine overlays to be transmitted to the subsequent client.

In some embodiments, the first virtual machine generates a first reconstructed media stream based on the first digest segment (e.g., before determining the first overlay and transmitting the first overlay to the first client device), wherein the first reconstructed media stream includes dummy data that is distinct from the video data. In some embodiments, the first virtual machine does not generate a first reconstructed media stream based on the first digest segment. For example, the first virtual machine already has access to the first media stream segment and determines the first overlay for the first media stream segment using the unmodified first media stream segment (e.g., instead of reconstructing a media stream from the first digest segment using dummy data).

In some embodiments, the second virtual machine determines (942), using the first digest segment stored in the cache and the received playback position (e.g., progress report), a second overlay for the first media stream and transmit, to the second client device, the second overlay for the first media stream. In some embodiments, the second overlay is determined using the reconstructed media stream that is generated by the second virtual machine. For example, the first overlay transmitted to the first client device is distinct from the second overlay transmitted to the second client device (e.g., the overlay is client-specific). In some embodiments, the first overlay and the second overlay comprise the same overlay (e.g., a standard overlay generated by the third-party application executing on the server system).

In some embodiments, the second virtual machine receives (944), from the second client device, a playback command (e.g., play, pause, fast forward, rewind, etc.). In some embodiments, in response to receiving the playback command, the second virtual machine determines, using the first reconstructed media stream (e.g., which is synchronized with the first media stream playing back at the second client device), a first playback position of the first media stream at the second client device (e.g., wherein a playback position of the first reconstructed media stream corresponds to the first playback position of the first media stream), wherein the second overlay is determined based on the playback command for the first media stream and the second overlay is transmitted to the second client device for display at the first playback position of the first media stream. For example, in response to a command to pause the media stream segment received at the second client device, the second virtual machine determines the playback position of the media stream at the second client device and determines an overlay (e.g., a scrubber bar indicating a current playback position)

for the current playback position and transmits the overlay to the second client device for display over the first media stream.

In some embodiments, the first virtual machine of the one or more virtual machines executes (946) a first application that includes a first Application Programming Interface (API) and determining the first overlay comprises transmitting the first reconstructed media stream to the first application via the first API and receiving the first overlay back from the first API (e.g., based on the playback command received from the first client device). For example, the server system (e.g., the first virtual machine) calls the first API using the reconstructed media stream.

In some embodiments, the first overlay comprises (948) one or more graphical user interface elements provided by the first application. For example, the graphical interface elements include one or more affordances for controlling playback, such as a scrubber bar indicating a current playback position, controls to play/pause, controls to turn on subtitles, etc. In some embodiments, the playback command received from the client device comprises a selection of one or more of the affordances displayed in the first overlay.

In some embodiments, a fourth virtual machine receives (950) a fourth media stream that includes a plurality of frames of video data, wherein the fourth media stream includes content distinct from the first content of the first media stream. In accordance with a determination that the fourth media stream is not associated with a digest segment stored in the cache (e.g., including the first digest segment corresponding to the first content of the first media stream), the fourth virtual machine sends a request for the fourth media stream that includes the plurality of frames of video data, generates a second digest segment for the fourth media stream, and stores the second digest segment for the fourth media stream in the cache. In some embodiments, the fourth virtual machine is distinct from the first and second virtual machines. It will be understood that operations performed by any virtual machine described herein may also be performed by another virtual machine.

In some embodiments, a fifth virtual machine receives (952) a fifth media stream that includes a plurality of frames of video data from a third client device; in accordance with a determination that the fifth media stream is associated with a digest segment stored in the cache, the fifth virtual machine sends a command to a third client device (e.g., and/or to the CDN) to stop transmitting the fifth media stream that includes a plurality of frames of video data. For example, an instruction to stop transmitting the fifth media stream (e.g., full, unmodified media stream) reduces the amount of bandwidth required while still allowing the virtual machine to remain synchronized with the client device. For example, the fifth virtual machine sends progress reports (e.g., updates at a set amount of time, such as every 30 seconds, and/or updates at a set number of video frames, such as every 5 frames) indicating its playback position instead of sending the entire fifth media stream to the server system.

FIG. 10 is a block diagram illustrating an exemplary server computer system 1000 in accordance with some implementations. In some embodiments, server computer system 1000 is an application server that executes virtual client virtual machine 103. The server computer system 1000 typically includes one or more central processing units/cores (CPUs) 1002, one or more network interfaces 1004, memory 1006, and one or more communication buses 1008 for interconnecting these components.

Memory 1006 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 1006, optionally, includes one or more storage devices remotely located from one or more CPUs 1002. Memory 1006, or, alternatively, the non-volatile solid-state memory device(s) within memory 1006, includes a non-transitory computer-readable storage medium. In some implementations, memory 1006, or the non-transitory computer-readable storage medium of memory 1006, stores the following programs, modules and data structures, or a subset or superset thereof:

- an operating system 1010 that includes procedures for handling various basic system services and for performing hardware dependent tasks;
- a network communication module 1012 that is used for connecting the server computer system 1000 to other computing devices via one or more network interfaces 1004 (wired or wireless) connected to one or more networks such as the Internet, other WANs, LANs, PANs, MANs, VPNs, peer-to-peer networks, content delivery networks, ad-hoc connections, and so on;
- one or more media assets modules 1014 for enabling the server computer system 1000 to perform various functions, the media assets modules 1014 including, but not limited to:
    - content delivery network modules 1016 for retrieving and/or processing media content received, for example, from CDN 105;
- one or more virtual client virtual machine modules 1018 for executing one or more VCVM(s) 103; in some implementations, the one or more virtual client virtual machine modules 1018 include:
    - smart graphics and media proxies 1020 for tracking graphical states of client devices and/or processing graphics content (e.g., SGMP 1020 includes SGMP 102 described above with reference of FIG. 1);
    - third party applications 1022 for execution on the VCVM(s) 103 (e.g., applications 1022 include third-party applications 101 described above);
    - digest generator module(s) 1024, such as digest creator 107, for generating digest segments based on media stream segments; and
    - API module(s) 1026 for calling and/or using APIs, including Network API 710 and the API of the third-party application (e.g., media playback API 712) to process playback of the media streams and/or digest segments.

In some implementations, the server computer system 1000 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 10 illustrates the server computer system 1000 in accordance with some implementations, FIG. 10 is intended more as a functional description of the various features that may be present in one or more media content servers than as a structural schematic of the implementations described herein. In practice, items shown separately could be combined and some items could be separated. For example, some items shown separately in FIG. 10 could be implemented on single servers and single items could be implemented by one or more servers. The actual number of servers used to implement server computer system 1000, and how features are allocated among them, will vary from one implementation to another and, optionally, depends in part on the amount of data traffic that the server system handles during peak usage periods as well as during average usage periods.

Figure 11:
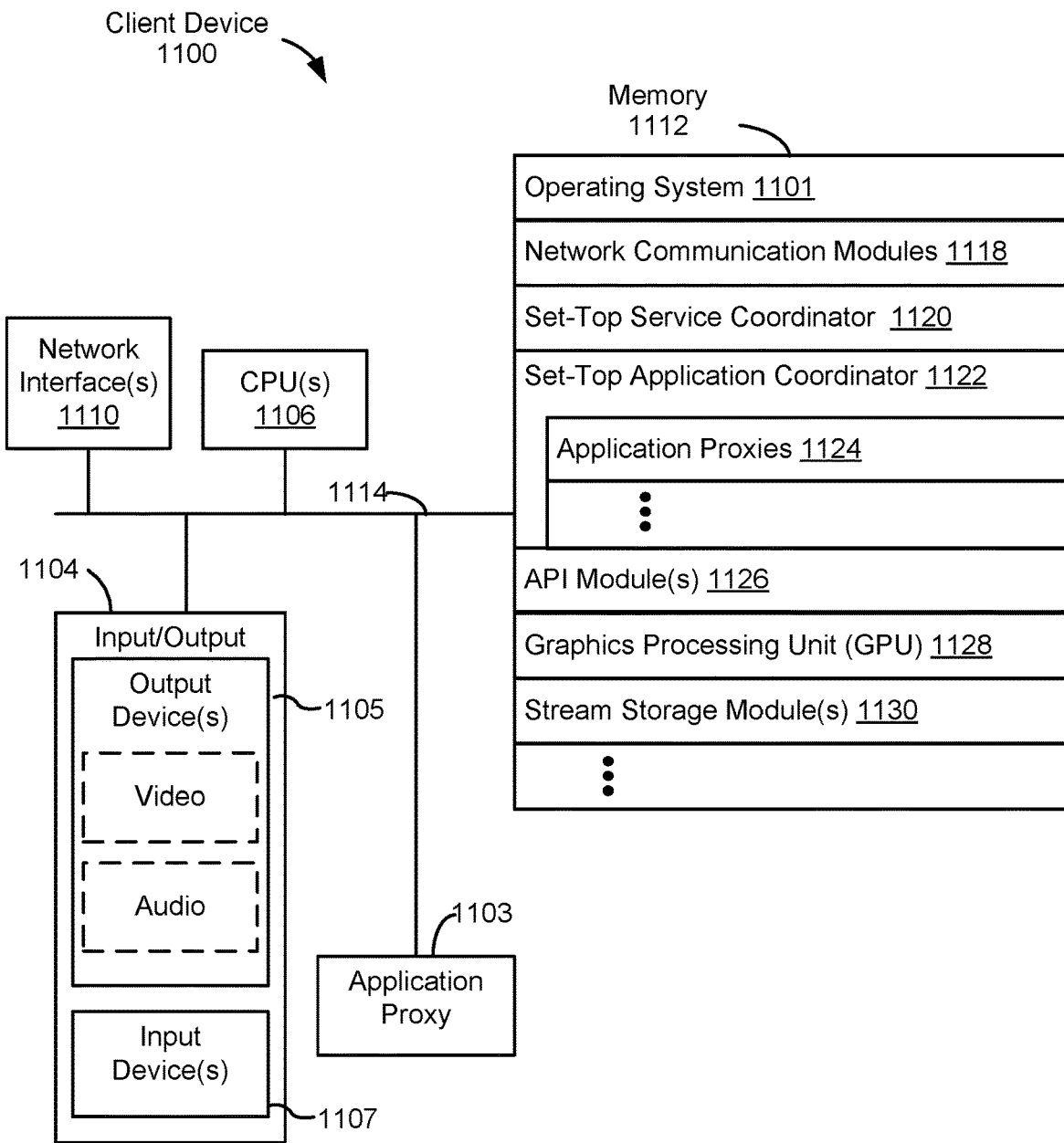
FIG. 11 is a block diagram of a client device, in accordance with some embodiments.

FIG. 11 is a block diagram illustrating an exemplary client device 1100 (e.g., client device 130 of FIG. 1) in accordance with some implementations. The client device 1100 typically includes one or more central processing units (CPU(s), e.g., processors or cores) 1106, one or more network (or other communications) interfaces 1110, memory 1108, and one or more communication buses 1114 for interconnecting these components. The communication buses 1114 optionally include circuitry (sometimes called a chipset) that interconnects and controls communications between system components.

The client device includes input/output module 1104, including output device(s) 1105, such as video output and audio output, and input device(s) 1107. In some implementations, the input devices 1107 include a keyboard, a remote controller, or a track pad. For example, output device 1105 is used for outputting video and/or audio content (e.g., to be reproduced by one or more displays and/or loudspeakers coupled with client device 1100) and/or input device 1107 is used for receiving user input (e.g., from a component of client device 1100 (e.g., keyboard, mouse, and/or touchscreen) and/or a control coupled to client device 1100 (e.g., a remote control)). Alternatively, or in addition, the client device includes (e.g., is coupled to) a display device (e.g., to display video output).

The client device includes application proxy 1103 for communicating with third-party applications that are executing on the server system. For example, instead of storing and executing the application(s) on the client device, application proxy 1103 receives commands (e.g., from a virtual machine in the server system) and, based on the received commands, instructs the client device to update the display accordingly.

In some implementations, the one or more network interfaces 1110 include wireless and/or wired interfaces for receiving data from and/or transmitting data to other client devices 1100, a server computer system 1000, and/or other devices or systems. In some implementations, data communications are carried out using any of a variety of custom or standard wired protocols (e.g., USB, Firewire, Ethernet, etc.).

Memory 1112 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 1112 may optionally include one or more storage devices remotely located from the CPU(s) 1106. Memory 1112, or alternately, the non-volatile memory solid-state storage devices within memory 1112, includes a non-transitory computer-readable storage medium. In some implementations, memory 1112 or the non-transitory computer-readable storage medium of memory 1112 stores the following programs, modules, and data structures, or a subset or superset thereof:

an operating system 1101 that includes procedures for handling various basic system services and for performing hardware dependent tasks;

network communication module(s) 1118 for connecting the client device 1100 to other computing devices (e.g., client devices 103, server computer system 1000, and/or other devices) via the one or more network interface(s) 1110 (wired or wireless);

a set-top service coordinator 1120 for communicating with an operator data center, such as orchestrator 110 for handling content services provided to the client device (e.g., set-top box);

a set-top application coordinator 1122 for managing a plurality of third-party applications executing at the server system, the set-top application coordinator having additional module(s), including but not limited to:
  one or more application proxies 1124 for communicating (e.g., graphical states) with third-party applications (e.g., application 101);

API Module(s) 1126 for managing a variety of APIs, including, for example, OpenGL and/or OpenMAX;

Graphics Processing Unit (GPU) 1128 for rendering graphical content, including frame buffering and display control; and a stream storage module(s) 1130 for storing original media content (e.g., from CDN 105), such as storing an original segment of a video stream.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 1006 and the memory 1112) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 1006 and the memory 1112 include one or more storage devices remotely located from the CPU(s) 1002 and 1106. The memory 1006 and the memory 1112, or alternatively the non-volatile memory device(s) within these memories, comprises a non-transitory computer readable storage medium.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method comprising:
at a server system hosting one or more virtual machines, each associated with a respective client device of one or more client devices for playback of media streams:
receiving a first media stream that includes first content corresponding to a plurality of frames of video data;
generating a first digest segment that corresponds to the first media stream, wherein the first digest segment includes a representation of the plurality of frames but does not include the video data;
storing the first digest segment in a cache at the server system;
receiving a playback position of the first media stream at a first client device; and
using the playback position from the first client device and the first digest segment stored in the cache to perform processing to recreate a representation of the playback of the first media stream on the first client device.

2. The method of claim 1, further comprising:
determining, using the first digest segment, a first overlay for the first media stream; and
transmitting, to a second client device distinct from the first client device, the first overlay for the first media stream.

3. The method of claim 1, wherein processing to recreate a representation of the playback of the first media stream on the first client device comprises using the first digest segment, stored in the cache, to generate a reconstructed media stream based on the first digest segment, wherein the reconstructed media stream includes dummy data that is distinct from the video data.

4. The method of claim 1, further comprising:
determining, using the first digest segment stored in the cache and the received playback position, a second overlay for the first media stream; and
transmitting, to the first client device, the second overlay for the first media stream.

5. The method of claim 4, further comprising:
at a first virtual machine of the one or more virtual machines that corresponds to the first client device:
receiving, from the first client device, a playback command;
in response to receiving the playback command, determining, using the recreated representation of the playback of the first media stream, a first playback position of the first media stream at the first client device, wherein:
the second overlay is determined based on the playback command for the first media stream; and
the second overlay is transmitted to the first client device for display at the first playback position of the first media stream.

6. The method of claim 5, wherein:
the first virtual machine of the one or more virtual machines executes a first application that includes a first Application Programming Interface (API); and
determining the first overlay comprises transmitting the recreated representation of the playback of the first media stream to the first application via the first API and receiving the first overlay back from the first API.

7. The method of claim 6, wherein the first overlay comprises one or more graphical user interface elements provided by the first application.

8. The method of claim 1, further comprising, determining, at a second virtual machine of the one or more virtual machines, that there is not a digest segment stored in the cache corresponding to the first media stream, wherein the generating and storing are performed by the second virtual machine in accordance with the determination that there is not a digest segment stored in the cache corresponding to the first media stream.

9. The method of claim 8, wherein the first media stream that includes the first content is received at the second virtual machine of the one or more virtual machines.

10. The method of claim 1, further comprising:
receiving a second media stream that includes a plurality of frames of video data, wherein the second media stream includes content distinct from the first content of the first media stream; and
in accordance with a determination that the second media stream is not associated with a digest segment stored in the cache:
sending a request for the second media stream that includes the plurality of frames of video data;
generating a second digest segment for the second media stream; and
storing the second digest segment for the second media stream in the cache.

11. The method of claim 1, further comprising:
receiving a third media stream that includes a plurality of frames of video data from a third client device; and
in accordance with a determination that the third media stream is associated with a digest segment stored in the cache, sending a command to the third client device to stop transmitting the third media stream that includes a plurality of frames of video data.

12. The method of claim 1, wherein the video data comprises image content in each frame of the plurality of frames in the first media stream.

13. The method of claim 1, wherein the playback position comprises a timestamp indicating a position within the first media stream.

14. The method of claim 1, wherein the playback position further comprises frame headers for the first media stream.

15. The method of claim 1, wherein the representation of the plurality of frames in the first digest segment includes at least one respective frame header that corresponds to a respective frame of the plurality of frames.

16. The method of claim 1, wherein the representation of the plurality of frames in the first digest segment includes a frame identifier for at least one respective frame of the plurality of frames.

17. The method of claim 1, wherein the first media stream is received from a second client device distinct from the first client device.

18. The method of claim 1, wherein the first media stream is received from a content provider.

19. A non-transitory computer readable storage medium storing one or more programs for execution by a server system hosting one or more virtual machines, each associated with a respective client device of one or more client devices for playback of media streams, the one or more programs including instructions for:
  receiving a first media stream that includes first content corresponding to a plurality of frames of video data;
  generating a first digest segment that corresponds to the first media stream, wherein the first digest segment includes a representation of the plurality of frames but does not include the video data;
  storing the first digest segment in a cache at the server system;
  receiving a playback position of the first media stream at a first client device; and
  using the playback position from the first client device and the first digest segment stored in the cache to perform processing to recreate a representation of the playback of the first media stream on the first client device.

20. A server system, hosting one or more virtual machines, each associated with a respective client device of one or more client devices for playback of media streams, comprising:
  one or more processors; and
  memory storing one or more programs for execution by the one or more processors, the one or more programs including instructions for:
    receiving a first media stream that includes first content corresponding to a plurality of frames of video data;
    generating a first digest segment that corresponds to the first media stream, wherein the first digest segment includes a representation of the plurality of frames but does not include the video data;
    storing the first digest segment in a cache at the server system;
    receiving a playback position of the first media stream at a first client device; and
    using the playback position from the first client device and the first digest segment stored in the cache to perform processing to recreate a representation of the playback of the first media stream on the first client device.

* * * * *